(12) United States Patent
Hughes et al.

(10) Patent No.: US 6,393,536 B1
(45) Date of Patent: May 21, 2002

(54) LOAD/STORE UNIT EMPLOYING LAST-IN-BUFFER INDICATION FOR RAPID LOAD-HIT-STORE

(75) Inventors: William Alexander Hughes, Burlingame, CA (US); James Scott Roberts, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/314,180

(22) Filed: May 18, 1999

(51) Int. Cl.[7] .......................... G06F 12/00; G06F 13/00
(52) U.S. Cl. ..................... 711/159; 711/118; 711/156; 712/225
(58) Field of Search ................. 711/118, 144, 711/156, 159; 712/218, 225

(56) References Cited

U.S. PATENT DOCUMENTS

| | | |
|---|---|---|
| 5,276,828 A | 1/1994 | Dion |
| 5,440,752 A | 8/1995 | Lentz et al. |
| 5,487,156 A | 1/1996 | Popescu et al. |
| 5,490,259 A | 2/1996 | Hiraoka et al. |
| 5,557,763 A | 9/1996 | Senter et al. |
| 5,625,835 A | 4/1997 | Ebcioglu et al. |
| 5,652,859 A | 7/1997 | Mulla et al. |
| 5,710,902 A | 1/1998 | Sheaffer et al. |
| 5,742,791 A | 4/1998 | Mahalingaiah et al. |
| 5,751,983 A | 5/1998 | Abramson et al. |
| 5,761,712 A | 6/1998 | Tran et al. |
| 5,764,938 A | 6/1998 | White et al. |
| 5,768,555 A * | 6/1998 | Tran et al. .................. 712/216 |
| 5,781,790 A | 7/1998 | Abramson et al. |
| 5,802,588 A | 9/1998 | Ramagopal et al. |
| 5,805,849 A | 9/1998 | Jordan et al. |
| 5,812,812 A | 9/1998 | Afsar et al. |
| 5,832,297 A | 11/1998 | Ramagopal et al. |

(List continued on next page.)

FOREIGN PATENT DOCUMENTS

| | | |
|---|---|---|
| GB | 2 281 422 | 3/1995 |
| WO | 96/12227 | 4/1996 |

OTHER PUBLICATIONS

Leibholz et al., "The Alpha 21264: A 500 MHz Out-of-Order Execution Microprocessor," © 1997 IEEE, pp. 28–36.

Popescu et al., "The Metaflow Architecture," IEEE Micro Jun. 1991, pp. 10–13 and 63–73.

Primary Examiner—Matthew Kim
Assistant Examiner—Pierre M. Vital
(74) Attorney, Agent, or Firm—Conley, Rose & Tayon, PC; Lawrence J. Merkel

(57) ABSTRACT

A load/store unit includes a buffer configured to retain store memory operations which have probed the data cache. Each entry in the buffer includes a last-in-buffer (LIB) indication which identifies whether or not the store in that entry is the youngest store in the buffer to update the memory locations specified by the corresponding store address. Load addresses are compared to the store addresses, and the comparison result is qualified with the corresponding LIB indication such that only the youngest store is identified as a hit. At most one load hit store is detected. In one embodiment, the buffer also stores loads which have probed the data cache. To associate the load with the youngest store which is older than the load, the buffer records the store instruction tag of a store which is hit by the load during the initial probe (according to the LIB indications during the initial probe). During reprobes, the LIB indications are ignored and instead the store instruction tags are compared to the recorded store instruction tag. As stores are inserted into the buffer, the store address is compared to the addresses in the buffer. If a hit is detected, the LIB indication for the hit store is set to a state indicating that the hit store in not the last in buffer to update the corresponding store address. The LIB indication for the newly inserted store is set to a last-in-buffer state.

32 Claims, 11 Drawing Sheets

U.S. PATENT DOCUMENTS

| | | |
|---|---|---|
| 5,872,951 A | 2/1999 | Tran |
| 5,887,152 A | 3/1999 | Tran |
| 5,887,185 A | 3/1999 | Lynch |
| 5,903,740 A | 5/1999 | Walker et al. |
| 5,903,741 A * | 5/1999 | Witt et al. ................... 712/218 |
| 6,006,317 A * | 12/1999 | Ramagopal et al. .......... 712/23 |
| 6,065,103 A * | 5/2000 | Tran et al. ................... 711/156 |
| 6,266,744 B1 | 7/2001 | Hughes et al. |

* cited by examiner

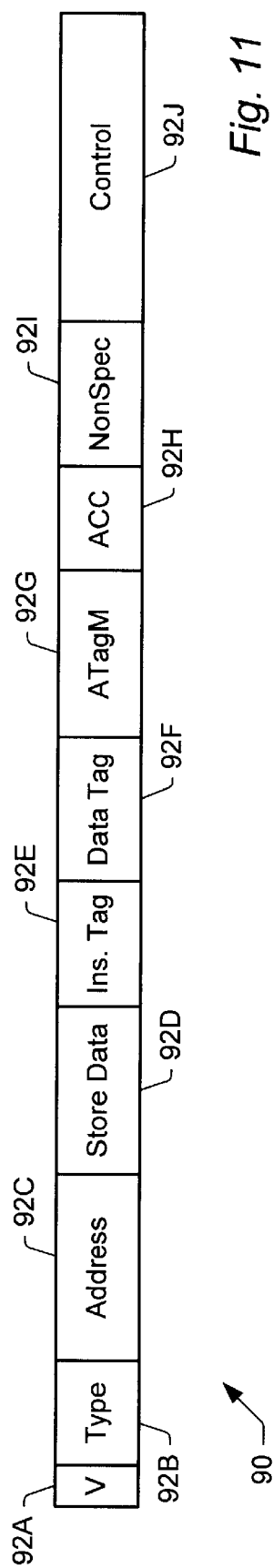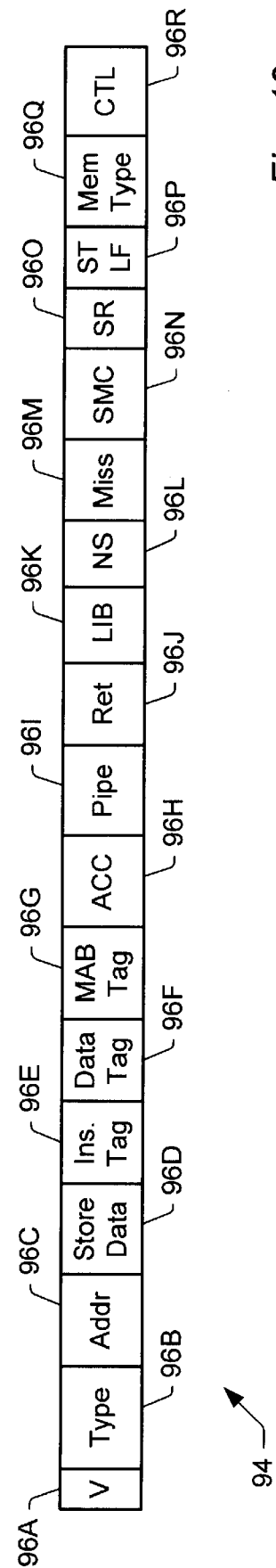

LOAD/STORE UNIT EMPLOYING LAST-IN-BUFFER INDICATION FOR RAPID LOAD-HIT-STORE

BACKGROUND OF THE INVENTION

1. Field of the Invention

This invention is related to processors and, more particularly, load hit store detection mechanisms within load/store units of processors.

2. Description of the Related Art

Processors are more and more being designed using techniques to increase the number of instructions executed per second. Superscalar techniques involve providing multiple execution units and attempting to execute multiple instructions in parallel. Pipelining, or superpipelining, techniques involve overlapping the execution of different instructions using pipeline stages. Each stage performs a portion of the instruction execution process (involving fetch, decode, execution, and result commit, among others), and passes the instruction on to the next stage. While each instruction still executes in the same amount of time, the overlapping of instruction execution allows for the effective execution rate to be higher. Typical processors employ a combination of these techniques and others to increase the instruction execution rate.

As processors employ wider superscalar configurations and/or deeper instruction pipelines, memory latency becomes an even larger issue than it was previously. While virtually all modern processors employ one or more caches to decrease memory latency, even access to these caches is beginning to impact performance.

More particularly, as processors allow larger numbers of instructions to be in-flight within the processors, the number of load and store memory operations which are in-flight increases as well. As used here, an instruction is "in-flight" if the instruction has been fetched into the instruction pipeline (either speculatively or non-speculatively) but has not yet completed execution by committing its results (either to architected registers or memory locations). Additionally, the term "memory operation" is an operation which specifies a transfer of data between a processor and memory (although the transfer may be accomplished in cache). Load memory operations specify a transfer of data from memory to the processor, and store memory operations specify a transfer of data from the processor to memory. Load memory operations may be referred to herein more succinctly as "loads", and similarly store memory operations may be referred to as "stores". Memory operations may be implicit within an instruction which directly accesses a memory operand to perform its defined function (e.g. arithmetic, logic, etc.), or may be an explicit instruction which performs the data transfer only, depending upon the instruction set employed by the processor. Generally, memory operations specify the affected memory location via an address generated from one or more operands of the memory operation. This address will be referred to herein in as a "data address" generally, or a load address (when the corresponding memory operation is a load) or a store address (when the corresponding memory operation is a store). On the other hand, addresses which locate the instructions themselves within memory are referred to as "instruction addresses".

Since memory operations are part of the instruction stream, having more instructions in-flight leads to having more memory operations in-flight. Unfortunately, adding additional ports to the data cache to allow more operations to occur in parallel is generally not feasible beyond a few ports (e.g. 2) due to increases in both cache access time and area occupied by the data cache circuitry. Accordingly, relatively larger buffers for memory operations are often employed. Scanning these buffers for memory operations to access the data cache is generally complex and, accordingly, slow. The scanning may substantially impact the load memory operation latency, even for cache hits.

Additionally, data caches are finite storage for which some load and stores will miss. A memory operation is a "hit" in a cache if the data accessed by the memory operation is stored in cache at the time of access, and is a "miss" if the data accessed by the memory operation is not stored in cache at the time of access. When a load memory operation misses a data cache, the data is typically loaded into the cache. Store memory operations which miss the data cache may or may not cause the data to be loaded into the cache. Data is stored in caches in units referred to as "cache lines", which are the minimum number of contiguous bytes to be allocated and deallocated storage within the cache. Since many memory operations are being attempted, it becomes more likely that numerous cache misses will be experienced. Furthermore, in many common cases, one miss within a cache line may rapidly be followed by a large number of additional misses to that cache line. These misses may fill, or come close to filling, the buffers allocated within the processor for memory operations. Accordingly, relatively deep buffers may be employed.

An additional problem which becomes even more onerous as processors employ wider superscalar configurations and/ or deeper pipelines is the issue of store to load forwarding. As more memory operations may be queued up prior to completion, it becomes more likely that load memory operations will hit prior store memory operations still in the buffers. Furthermore, as speculative instruction execution increases due to the larger number of instructions in-flight within the processor, it becomes more likely that loads will hit on multiple stores within the buffers. Complex hit prioritization logic is generally used to determine which of the multiple stores is the youngest store (i.e. the store nearest the load in program order, and hence the store which generates the data that the load should receive). The complex logic may induce additional delay, increasing the load latency. A method for rapidly forwarding store data to dependent loads is needed.

SUMMARY OF THE INVENTION

The problems outlined above are in large part solved by a load/store unit as describe herein. The load/store unit includes a buffer configured to retain store memory operations which have probed the data cache. Additionally, each entry in the buffer includes a last-in-buffer (LIB) indication which identifies whether or not the store in that entry is the last store in the buffer (i.e. the youngest store) to update the memory locations specified by the corresponding store address. Load addresses are compared to the store addresses, and the comparison result is qualified with the corresponding LIB indication such that only the youngest store is identified as a hit. Since at most one load hit store is detected, complex prioritization logic may be eliminated. Load latency may be reduced due to the elimination of the prioritization logic from the load's cache access/dependency check logic.

In one embodiment, the buffer also stores loads which have probed the data cache. Loads may reprobe from the buffer after a subsequent store has been placed in the buffer.

To properly associate the load with the youngest store which is older than the load, the buffer records the store instruction tag of a store which is hit by the load during the initial probe (according to the LIB indications during the initial probe). During reprobes, the LIB indications are ignored and instead the store instruction tags are compared to the recorded store instruction tag to detect the store which is hit by the load.

As stores are inserted into the buffer, the store address is compared in the same fashion as the load address. If a hit is detected, the LIB indication for the hit store is set to a state indicating that the hit store in not the last in buffer to update the corresponding store address. The LIB indication for the newly inserted store is set to a last-in-buffer state indicating that that newly inserted store is the last in buffer to update the corresponding store address. In this manner, one LIB indication per different address in the buffer is in the last-in-buffer state.

It is noted that the LIB indication may be maintained and used based on address ranges, rather than a full address compare. This may allow more rapid forwarding and may ease implementation. A subsequent, more accurate check of the addresses may be used to determine if the correct data was forwarded and to take corrective action if incorrect data was forwarded.

Broadly speaking, a load/store unit is contemplated. The load/store unit comprises a buffer including a plurality of entries and control logic coupled to the buffer. Each of the plurality of entries is configured to store a data address and a last-in-buffer (LIB) indication. The LIB indication, in a first state, is indicative that a corresponding store memory operation is a youngest store memory operation within the buffer to update a memory location identified by the data address. The control logic is also coupled to receive a first data address probing a data cache. The control logic is configured to identify a first entry of the plurality of entries for which: (i) the data address stored in the first entry matches the first data address, and (ii) the LIB indication stored in the first entry is in the first state. Additionally, a processor is contemplated. The processor comprises the load/store unit coupled to a data cache. The data cache is configured to store data. Still further, a computer system is contemplated. The computer system comprises the processor and an I/O device coupled to the processor. The I/O device is configured to communicate between the computer system and another computer system to which the I/O device is coupled.

Moreover, a method is contemplated. A data cache is probed with a first data address corresponding to a first memory operation. A first entry is identified within a buffer of memory operations. The first entry stores a second data address of a second memory operation and a last-in-buffer (LIB) indication. Identifying the first entry includes: (i) determining that the second address matches the first address; and (ii) determining that the LIB indication is in a first state indicative that the second memory operation comprises a store memory operation which is youngest in the buffer to update a memory location identified by the second address.

BRIEF DESCRIPTION OF THE DRAWINGS

Other objects and advantages of the invention will become apparent upon reading the following detailed description and upon reference to the accompanying drawings in which:

FIG. 7 is a flowchart illustrating operation of one embodiment of the control logic illustrated in FIGS. 4 and 5 in response to a store memory operation from an LS1 buffer shown in FIG. 3.

FIG. 11 is a block diagram illustrating one embodiment of an LS1 buffer entry.

FIG. 12 is a block diagram illustrating one embodiment of an LS2 buffer entry.

Figure 1:
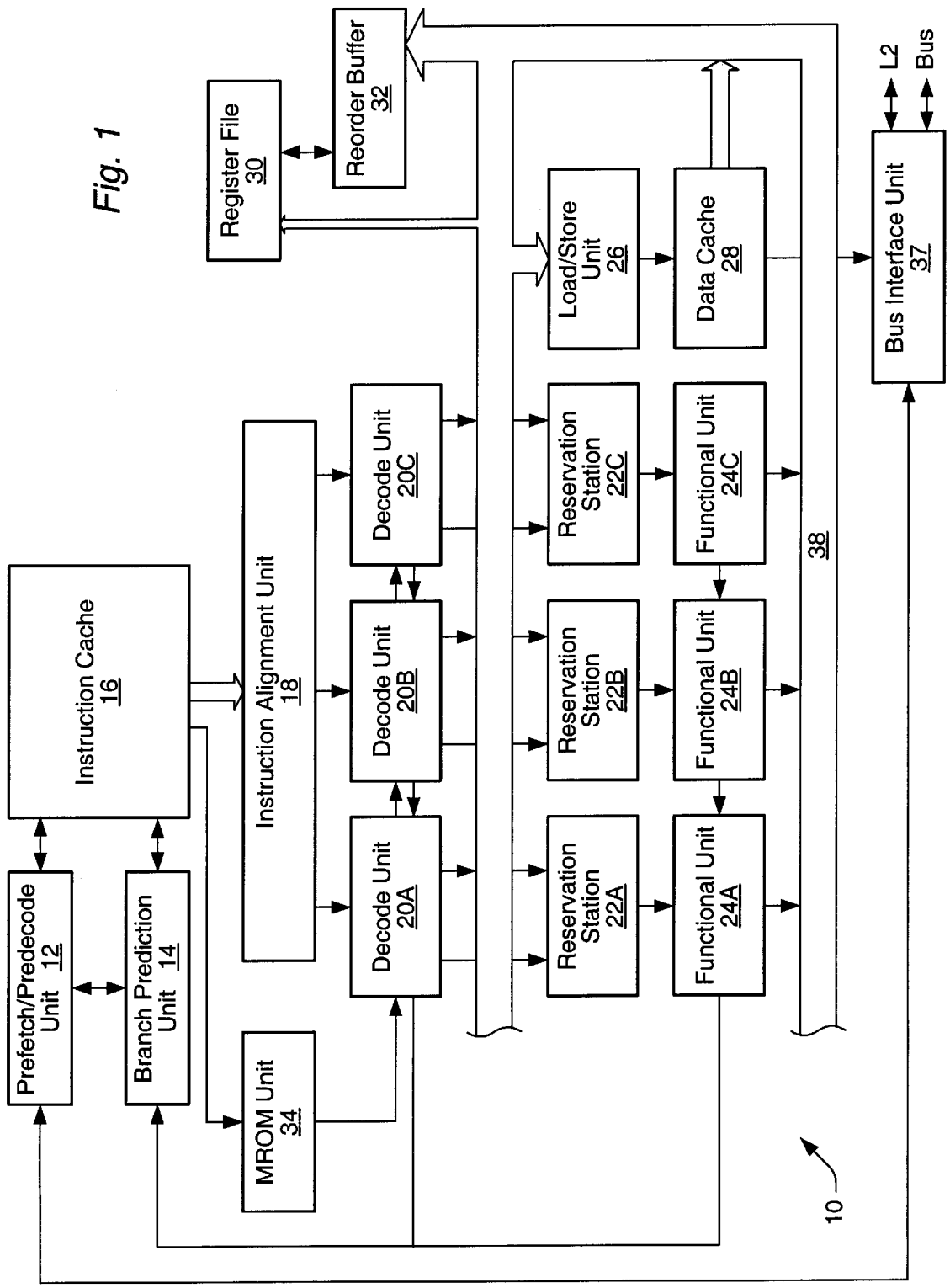
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a bus interface unit 37. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14.

Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to an L2 interface to an L2 cache and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 32 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| Start bits | 10000 |
|---|---|
| Endbits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod RIM byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to five pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and amanipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring"

the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be employed as well for interfacing to a level two cache.

Load/Store Unit

Figure 2:
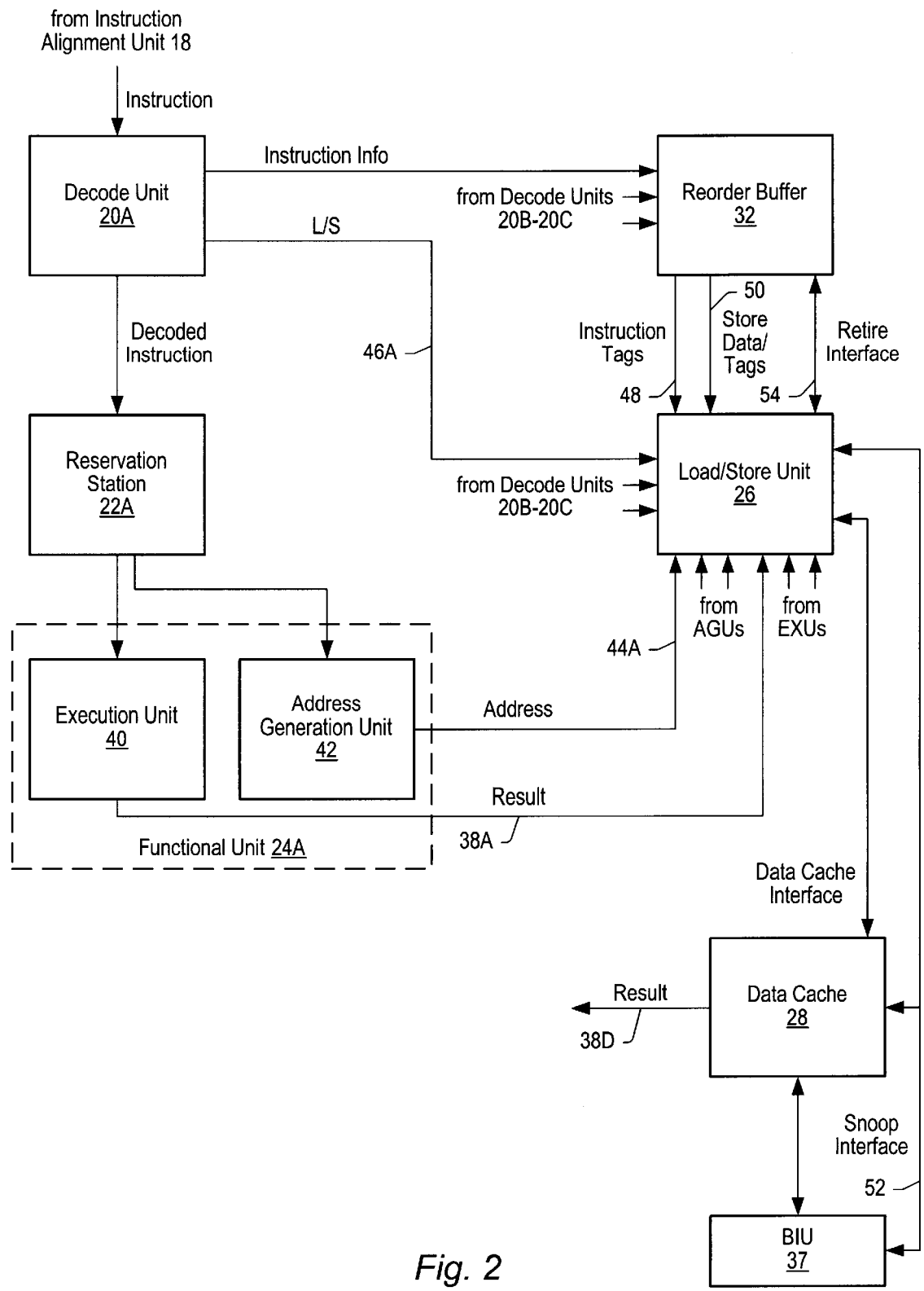
FIG. 2 is a block diagram illustrating various blocks shown in FIG. 1, highlighting interconnection therebetween according to one embodiment of the processor.

A more detailed discussion of one embodiment of load/store unit 26 is next provided. Other embodiments are possible and contemplated. FIG. 2 illustrates load/store unit 26, reorder buffer 32, data cache 28, bus interface unit (BIU) 37, decode unit 20A, reservation station 22A, and functional unit 24A to highlight certain interconnection therebetween according to one embodiment of processor 10. Other embodiments may employ additional, alternative, or substitute interconnect as desired. Interconnect between decode units 20B–20C, reservation stations 22B–22C, functional units 24B–24C, and other units shown in FIG. 2 may be similar to that shown in FIG. 2.

Decode unit 20A receives an instruction from instruction alignment unit 18 and decodes the instruction. Decode unit 20A provides the decoded instruction to reservation station 22A, which stores the decoded instruction until the instruction is selected for execution. Additionally, if the instruction specifies a load or store memory operation, decode unit 20A signals load/store unit 26 via L/S lines 46A. Similar signals from decode units 20B–20C may be received by load/store unit 26 as well. L/S lines 46A indicate whether a load memory operation, a store memory operation, or both are specified by the instruction being decoded. For example, L/S lines 46A may comprise a load line and a store line. If no memory operation is specified, then signals on both lines are deasserted. The signal on the load line is asserted if a load memory operation is specified, and similarly the signal on the store line is asserted if a store memory operation is specified. Both signals are asserted if both a load memory operation and a store memory operation are specified. In response to signals on L/S lines 46A, load/store unit 26 allocates an entry in a load/store buffer included therein to store the corresponding memory operation.

In addition to the above, decode unit 20A provides information to reorder buffer 32 about the instruction being decoded. Reorder buffer 32 receives the information (as well as similar information from other decode units 20B–20C) and allocates reorder buffer entries in response thereto. The allocated reorder buffer entries are identified by reorder buffer tags, which are transmitted to load/store unit 26 upon an instruction tags bus 48. Instruction tags bus 48 may be configured to transmit a tag for each possible instruction (e.g. three in the present embodiment, one from each of decode units 20A–20C). Alternatively, in an embodiment employing the line-oriented structure described above, reorder buffer 32 may be configured to transmit a line tag for the line, and load/store unit 26 may augment the line tag with the offset tag of the issue position which is signalling a particular load or store.

Reorder buffer 32 is further configured to perform dependency checking for register operands of the instruction. The register operands are identified in the instruction information transmitted by decode units 20. For store memory operations, the store data is a source operand which load/store unit 26 receives in addition to the store address. Accordingly, reorder buffer 32 determines the instruction which generates the store data for each store memory operation and conveys either the store data (if it is available within reorder buffer 32 or register file 30 upon dispatch of the store memory operation) or a store data tag for the store data on a store data/tags bus 50. If the instruction corresponding to the store memory operation is an explicit store instruction which stores the contents of a register to memory, the instruction tag of the instruction which generates the store data (or the store data, if it is available) is conveyed. On the other hand, the instruction itself generates the store data if the instruction includes the store memory operation as an implicit operation. In such cases, reorder buffer 32 provides the instruction tag of the instruction as the store data tag.

Although not illustrated in FIG. 2 for simplicity in the drawing, reservation station 22A receives operand tags and/or data for the instruction from reorder buffer 32 as well. Reservation station 22A captures the operand tags and/or data and awaits delivery of any remaining operand data (identified by the operand tags) from result buses 38. Once an instruction has received its operands, it is eligible for execution by functional unit 24A. More particularly, in the embodiment shown, functional unit 24A includes an execution unit (EXU) 40 and an address generation unit (AGU) 42. Execution unit 40 performs instruction operations (e.g. arithmetic and logic operations) to generate results which are forwarded on result bus 38A (one of result buses 38) to load/store unit 26, reservation stations 22, and reorder buffer 32. AGU 42 generates data addresses for use by a memory operation or operations specified by the instruction, and transmits the data addresses to load/store unit 26 via address bus 44A. It is noted that other embodiments may be employed in which AGU 42 and execution unit 40 share result bus 38A and in which functional unit 24A includes only an execution unit which performs address generation and other instruction execution operations. Load/store unit 26 is further coupled to receive result buses and address buses from the execution units and AGUs within other functional units 24B–24C as well.

Since the embodiment shown employs AGU 42, reservation station 22A may select the address generation portion of an instruction for execution by AGU 42 once the operands used to form the address have been received but prior to receiving any additional operands the instruction may specify. AGU 42 transmits the generated address to load/store unit 26 on address bus 44A, along with the instruction tag of the instruction for which the data address is generated. Accordingly, load/store unit 26 may compare the tag received on address bus 44A to the instruction tags stored in the load/store buffer to determine which load or store the data address corresponds to.

Load/store unit 26 monitors the result tags provided on result buses 38 to capture store data for store memory operations. If the result tags match a store data tag within load/store unit 26, load/store unit 26 captures the corresponding data and associates the data with the corresponding store instruction.

Load/store unit 26 is coupled to data cache 28 via a data cache interface. Load/store unit 26 selects memory operations to probe data cache 28 via the data cache interface, and receives probe results from the data cache interface. Generally speaking, a "probe" of the data cache for a particular memory operation comprises transmitting the data address of the particular memory operation to data cache 28 for data cache 28 to determine if the data address hits therein. Data cache 28 returns a probe result (e.g. a hit/miss indication) to load/store unit 26. In addition, if the particular memory operation is a load and hits, data cache 28 forwards the corresponding load data on a result bus 38D to reservation stations 22, reorder buffer 32, and load/store unit 26. In one embodiment, data cache 28 includes two ports and may thus receive up to 2 probes concurrently. Data cache 28 may, for example, employ a banked configuration in which cache lines are stored across at least two banks and two probes may be serviced concurrently as long as they access different banks. In one particular embodiment, data cache 28 may employ 8 banks. Various embodiments of the data cache interface are described in further detail below.

Data cache 28 is configured to allocate cache lines in response to probes that miss, and communicates with bus interface unit 37 to fetch the missing cache lines. Additionally, data cache 28 transmits evicted cache lines which have been modified to bus interface unit 37 for updating main memory.

Bus interface unit 37 is coupled to data cache 28 and load/store unit 26 via a snoop interface 52 as well. Snoop interface 52 may be used by bus interface unit 37 to determine if coherency activity needs to be performed in response to a snoop operation received from the bus. Generally, a "snoop operation" is an operation performed upon a bus for the purpose of maintaining memory coherency with respect to caches connected to the bus (e.g. within processors). When coherency is properly maintained, a copy of data corresponding to a particular memory location and stored in one of the caches is consistent with the copies stored in each other cache. The snoop operation may be an explicit operation, or may be an implicit part of an operation performed to the address of the particular memory location. Generally, the snoop operation specifies the address to be snooped (the "snoop address") and the desired state of the cache line if the address is stored in the cache. Bus interface unit transmits a snoop request via snoop interface 52 to data cache 28 and load/store unit 26 to perform the snoop operation.

Reorder buffer 32 manages the retirement of instructions. Reorder buffer 32 communicates with load/store unit 26 via retire interface 54 to identify instructions either being retired or ready for retirement. For example, in one embodiment stores do not update data cache 28 (or main memory) until they are retired. Additionally, certain load instruction may be restricted to be performed non-speculatively. Reorder buffer 32 may indicate memory operations which are retired or retireable to load/store unit 26 via retirement interface 54. Accordingly, the instruction information provided by decode units 20 to reorder buffer 32 for each instruction may include an indication of whether or not the instruction includes a load or store operation. Load/store unit 26 may return an acknowledgment to reorder buffer 32 that a particular memory operation is logged as retired, and reorder buffer 32 may subsequently retire the corresponding instruction.

Since the load/store buffer may become full at times, load/store unit 26 may employ a flow control mechanism to stall subsequent memory operations at decode units 20 until sufficient entries are freed (via completion of earlier memory operations) within the load/store buffer for the subsequent memory operations. For example, load/store unit 26 may broadcast a count of the number of free entries to decode units 20, which may stall if the count indicates that insufficient entries are available for the memory operations of instructions being decoded. According to one particular embodiment, the instructions being concurrently decoded by decode units 20 move to reservation stations 22 in lockstep (so that a line may be allocated in reorder buffer 32 for the instructions, as described above with respect to FIG. 1). In such an embodiment, decode units 20 may stall until sufficient entries are available for all memory operations within the set of concurrently decoded instructions. Alternatively, load/store unit 26 may employ a stall signal for stalling subsequent memory operations until buffer entries are available. Any suitable flow control mechanism may be used.

Figure 3:
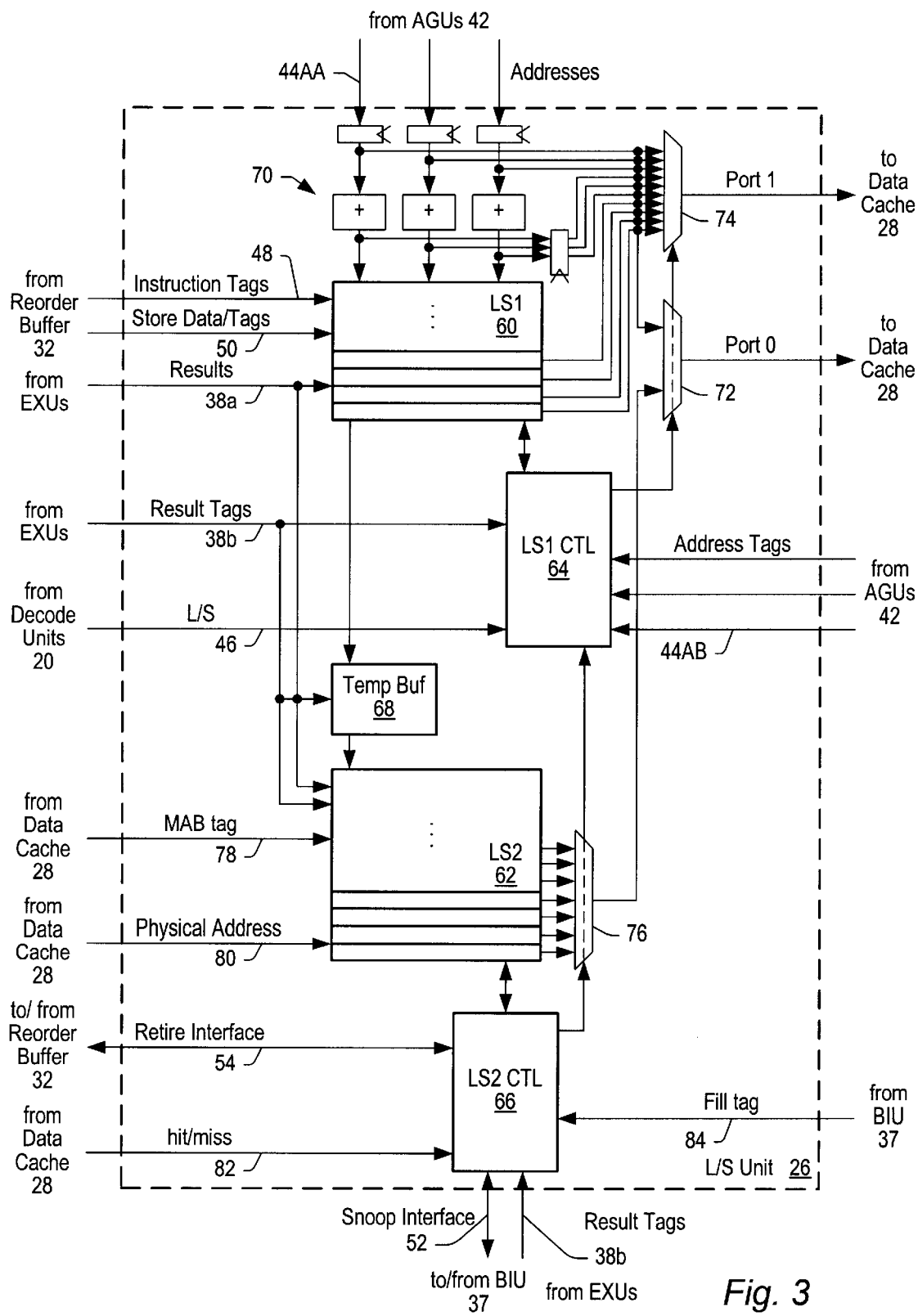
FIG. 3 is a block diagram of one embodiment of a load/store unit.

Turning now to FIG. 3, a block diagram of one embodiment of load/store unit 26 is shown. Other embodiments are possible and contemplated. In the embodiment of FIG. 3, load/store unit 26 includes a first load/store buffer (LS1 buffer) 60, a second load/store buffer (LS2 buffer) 62, an LS1 control logic 64, an LS2 control logic 66, a temporary buffer 68, segment adders 70, a port 0 multiplexor (mux) 72, a port 1 mux 74, and an LS2 reprobe mux 76. Segment adders 70 are coupled to receive data addresses from AGUs 42 within functional units 24A–24C (e.g. address bus 44AA, part of address bus 44A shown in FIG. 2, conveys the data address from AGU 42 within functional unit 24A). Muxes 70 and 72 are coupled to receive the data addresses from AGUs 42 and the outputs of segment adders 70, as well as being coupled to LS1 buffer 60. Mux 72 also receives an input from LS2 reprobe mux 76. Furthermore, LS1 buffer 60 is coupled to segment adders 70, LS1 control logic 64, temporary buffer 68, instruction tags bus 48, store data/tags bus 50, and results buses 38a (the result data portion of result buses 38). LS1 control logic 64 is coupled to muxes 72 and 74 and to LS2 control logic 66. Furthermore, LS1 control logic 64 is coupled to receive address tags from AGUs 42 (e.g. address tag bus 44AB, part of address tag bus 44A shown in FIG. 2, conveys the address tag from AGU 42 within functional unit 24A), result tags via result tags buses 38b (the result tag portion of result buses 38), and L/S lines 46 (including L/S lines 46A from decode unit 20A). Temporary buffer 68 and LS2 buffer 62 are coupled to results buses 38a and result tags buses 38b. LS2 buffer 62 is further coupled to receive a miss address buffer (MAB) tag on a MAB tag bus 78 and a physical address on a physical address bus 80 from data cache 28. LS2 buffer 62 is still further coupled to mux 76, LS2 control logic 66, and temporary buffer 68. LS2 control logic 66 is further coupled to mux 76, retire interface 54, result tags buses 38b, snoop interface 52, hit/miss signals 82 from data cache 28, and a fill tag bus 84 from bus interface unit 37.

Generally speaking, load/store unit 26 includes a pre-cache buffer (LS1 buffer 60) and a post-cache buffer (LS2 buffer 62). Memory operations are allocated into LS1 buffer 60 upon dispatch within processor 10, and remain within LS1 buffer 60 until selected to probe data cache 28. Subsequent to probing data cache 28, the memory operations are moved to LS2 buffer 62 independent of the probe status (e.g. hit/miss, etc.). Since LS1 buffer 60 stores memory operations which have yet to probe data cache 28 and the memory operations are removed from LS1 buffer 60 upon probing data cache 28, a relatively simple scanning scheme may be used to select memory operations to probe data cache 28. Since the scheme is simple, it may be performed rapidly and may aid in keeping load latency low for loads which hit data cache 28. Additionally, since memory operations are deleted from LS1 after probing data cache 28, the size (i.e. number of entries) of LS1 buffer 60 may be relatively small as compared to the total number of memory operations which may be in-flight.

Memory operations which miss may subsequently be selected through LS2 reprobe mux 76 and port 0 mux 72 to reprobe data cache 28. The term "reprobe", as used herein, refers to probing a cache for a second or subsequent attempt after the first probe for a particular memory operation. Additionally, store memory operations may be held in LS2 buffer 62 until the stores are in condition for retirement. LS2 buffer 62 may be made deeper than LSI buffer 60, allowing for large numbers of misses to be stored therein. Since, in many cases, memory operations accessing the same cache line tend to be near each other in an instruction stream, a relatively large number of misses to the same cache line may be queued in LS2 buffer 62. Subsequent memory operations which hit data cache 28 may then be selected from LS1 buffer 60 and serviced. Average cache bandwidth may thereby be increased. Furthermore, by allowing the queuing of numerous cache misses in LS2, it may be possible in many cases to keep bus interface unit 37 busy servicing numerous cache line fetch requests from data cache 28, thereby maximizing use of external bus bandwidth.

In response to signals on L/S lines 46, LS1 control logic 64 allocates entries within LS1 buffer 60 to the identified load and store memory operations. The respective instruction tags and store data/tags (if applicable) are received into the allocated entries by LS1 buffer 60 under the control of LS1 control logic 64. Subsequently, the corresponding data addresses are received from the AGUs (identified by the address tags received by LS1 control logic 64) and are stored into the allocated entries.

A memory operation which has received its address becomes eligible to probe data cache 28. LS1 control logic 64 scans the LS1 buffer entries for memory operations to probe data cache 28, and generates selection controls for port 0 mux 72 and port 1 mux 74. Accordingly, up to two memory operations may probe data cache 28 per clock cycle in the illustrated embodiment. According to one particular implementation, LS1 control logic 64 selects memory operations for probing data cache 28 in program order. Accordingly, LS1 control logic 64 may be configured to limit scanning to the oldest memory operations within LS1 buffer 60. The "program order" of the memory operations is the order the instructions would be executed in if the instructions were fetched and executed one at a time. Furthermore, the program order of instructions speculatively fetched (according to branch predictions, for example) is the order the instructions would be executed in as stated above under the assumption that the speculation is correct. Instructions which are prior to other instructions in the program order are said to be older than the other instructions. Conversely, instructions which are subsequent to other instructions in program order are said to be younger than the other instructions. It is noted that other implementations may select memory operations to probe data cache 28 out of order, as desired.

LS1 control logic 64 is configured to select a memory operation to probe data cache 28 as the data address is received (provided, in the present embodiment, that the memory operation is within an entry being scanned by LS1 control logic 64). If the address tags received from the AGUs 42 match an instruction tag of an otherwise selectable memory operation, LS1 control logic 64 selects the corresponding data address received from the AGU 42 via one of muxes 72 and 74.

While the data address may be selected for probing as it is provided to load/store unit 26, the data address is also provided to one of segment adders 70. Segment adders 70 are included in the present embodiment to handle the segmentation portion of the x86 addressing scheme. Embodiments which do not employ the x86 instruction set architecture may eliminate segment adders 70. Generally, AGUs 42 generate a virtual address corresponding to the memory operation. The virtual address is the address generated by adding the address operands of an instruction. The virtual address is translated through an address translation mechanism specified by the instruction set architecture employed by processor 10 to a physical address. The physical address identifies a memory location within main memory. In the x86 architecture, a two-tiered translation scheme is defined from a logical address (or virtual address) to a linear address through a segmentation scheme and then to the physical address through a paging scheme. Since AGUs 42 add the address operands of the instruction, the data address provided by the AGUs is a logical address. However, modern instruction code is generally employing a "flat addressing mode" in which the segment base addresses (which are added to the logical address to create the linear address) are programmed to zero. Accordingly, load/store unit 26 presumes that the segment base address is zero (and hence the logical and linear addresses are equal) and selects the logical address to probe data cache 28. Segment adders 70 add the segment base address of the selected segment for the memory operation and provide the linear address to muxes 72 and 74 and to LS1 buffer 60 for storage. If the segment base address for a particular memory operation is non-zero and the memory operation was selected to probe data cache 28 upon receiving the logical address, LS1 control logic 64 may cancel the previous access (such that load data is not forwarded) and select the corresponding linear address from the output of the corresponding segment adder 70 for probing data cache 28. In other alternative embodiments, AGUs 42 may receive the segment base address and generate linear addresses. Still other embodiments may require flat addressing mode and segment base addresses may be ignored.

Muxes 72 and 74 are coupled to receive data addresses from entries within LS1 buffer 60 as well. The data address corresponding to a memory operation is stored in the LS1 entry assigned to the memory operation upon receipt from the AGUs 42. The data address is selected from the entry upon selecting the memory operation to probe data cache 28. It is noted that, in addition to the data address, other information may be transmitted to data cache 28 via muxes 70 and 72. For example, an indication of whether the memory operation is a load or store may be conveyed. The instruction tag of the memory operation may be conveyed for forwarding on result buses 38D with the load data for load memory operations. The size of the operation (for muxing out the appropriate data) may be conveyed as well. Any desirable information may be transmitted according to design choice.

Store data may be provided for a store memory operation while the store memory operation resides in LS1 buffer 60. Accordingly, LS1 control logic 64 may monitor result tags buses 38b. If a tag matching a store data tag within LS1 buffer 64 is received, the corresponding store data from the corresponding one of result buses 38a is captured into the entry having the matching store data tag.

LS1 control logic 64 removes memory operations from LS1 buffer 60 in response to the memory operations probing data cache 28. In one particular embodiment, memory operations are removed the cycle after they are selected for probing data cache 28. The cycle after may be used to allow, in cases in which a memory operation is selected upon generation of the data address by one of AGUs 42, for the data address to propagate into LS1 buffer 60. Other embodiments may chose to remove the memory operations during the cycle that the memory operations are selected. Because the memory operations are removed the cycle after they are selected, LS1 control logic 64 is configured to scan the oldest 4 entries in LS1 buffer 60 to select memory operations for probing data cache 28 (up to two entries selected in the previous clock cycle and up to two entries being selectable in the present clock cycle).

Memory operations removed from LS1 buffer 60 are moved to temporary buffer 68. Temporary buffer 68 may be provided to ease timing constraints in reading entries from LS1 buffer 60 and writing them to LS2 buffer 62. Accordingly, temporary buffer 68 is merely a design convenience and is entirely optional. The clock cycle after a memory operation is moved into temporary buffer 68, it is moved to LS2 buffer 62. Since store data may be received upon results buses 38 during the clock cycle a store memory operation is held in temporary buffer 68, temporary buffer 68 monitors result tags on result tags buses 38b and captures data from result buses 38a in a manner similar to LS1 buffer 60 capturing the data.

Accordingly, memory operations which have probed data cache 28 are placed into LS2 buffer 62. In the present embodiment, all memory operations are placed into LS2 buffer 62 after an initial probe of data cache 28. Stores are held in LS2 buffer 62 until they can be committed to data cache 28 (i.e. until they are allowed to update data cache 28). In general, stores may be committed when they become non-speculative. In one embodiment, stores may be committed in response to their retirement (as indicated via retirement interface 54) or at any time thereafter. Loads are held in LS2 buffer 62 until they retire as well in the present embodiment. Load hits remain in LS2 buffer 62 for snooping purposes. Load misses are held in LS2 at least until the cache line accessed by the load is being transferred into data cache 28. In response to the cache line (or portion thereof including the load data) being scheduled for updating the cache, the load miss is scheduled for reprobing data cache 28. Upon reprobing, the load miss becomes a load hit (and the load data is forwarded by data cache 28) and is retained as such until retiring.

LS2 control logic 66 allocates entries within LS2 buffer 62 for memory operations which have probed data cache 28. Additionally, LS2 control logic 66 receives probe status information from data cache 28 for each of the probes on hit/miss signals 82. The hit/miss information is stored in the LS2 buffer entry corresponding to the memory operation for which the probe status is provided. In one embodiment, data cache 28 includes address translation circuitry which, in parallel with access to the data cache, attempts to translate the virtual address to the physical address. If a translation is not available within the address translation circuitry, the probe may be identified as a miss until a translation is established (by searching software managed translation tables in main memory, for example). In one specific implementation, the address translation circuitry within data cache 28 comprises a two level translation lookaside buffer (TLB) structure including a 32 entry level-one TLB and a 4 way set associative, 256 entry level-two TLB.

If the data address of the memory operation is successfully translated by data cache 28, the corresponding physical address is provided on physical address bus 80. LS2 control logic causes the corresponding entry to overwrite the virtual address with the physical address. However, certain virtual address bits may be separately maintained for indexing purposes on reprobes and store data commits for embodiments in which data cache 28 is virtually indexed and physically tagged.

For memory operations which miss data cache 28, data cache 28 allocates an entry in a miss address buffer included therein. The miss address buffer queues miss addresses for transmission to bus interface unit 37, which fetches the addresses from the L2 cache or from main memory. A tag identifying the entry within the miss address buffer (the MAB tag) is provided on MAB tag bus 78 for each memory operation which misses. It is noted that data cache 28 allocates miss address buffer entries on a cache line basis. Accordingly, subsequent misses to the same cache line receive the same MAB tag and do not cause an additional miss address buffer entry to be allocated.

Bus interface unit 37 subsequently fetches the missing cache line and returns the cache line as fill data to data cache 28. Bus interface unit 37 also provides the MAB tag corresponding to the cache line as a fill tag on fill tag bus 84. LS2 control logic 66 compares the fill tag to the MAB tags within LS2 buffer 62. If a match on the MAB tag occurs for a load memory operation, then that load may be selected for reprobing data cache 28. If more than one match is detected, the oldest matching load may be selected with other memory operations selected during subsequent clock cycles. Stores which match the MAB tag are marked as hits, but wait to become non-speculative before attempting to commit data.

In one embodiment, the cache line of data is returned using multiple packets. Each load memory operation may record which packet it accesses (or the packet may be discerned from the appropriate address bits of the load address), and bus interface unit 37 may identify the packet being returned along with the fill tag. Accordingly, only those loads which access the packet being returned may be selected for reprobing.

Bus interface unit 37 provides the fill tag in advance of the fill data to allow a load to be selected for reprobing and to be transmitted to data cache 28 via port 0 to arrive at the data forwarding stage concurrent with the packet of data reaching data cache 28. The accessed data may then be forwarded.

Since stores are moved to LS2 buffer 62 after probing data cache 28 and subsequent loads are allowed to probe data cache 28 from LS1 buffer 60 and forward data therefrom, it is possible that a younger load accessing the same memory location as an older store will probe data cache 28 prior to the older store committing its data to data cache 28. The correct result of the load is to receive the store data corresponding to the older store. Accordingly, LS2 control logic 66 monitors the probe addresses and determines if older stores to those addresses are within LS2 buffer 62. If a match is detected and the store data is available within LS2 buffer 62, LS2 control logic 66 signals data cache 28 to select data provided from LS2 buffer 62 for forwarding and provides the selected data. On the other hand, if a match is detected and the store data is not available within LS2 buffer 62, forwarding of data from data cache 28 is cancelled. The load is moved into LS2 buffer 62, and is selected for reprobing until the store data becomes available. Additional details regarding store to load forwarding are provided further below.

Generally, LS2 control logic 66 is configured to scan the entries within LS2 buffer 62 and select memory operations to reprobe data cache 28. Load misses are selected to reprobe in response to the data being returned to data cache 28. Loads which hit older stores are selected to reprobe if they are not currently reprobing. Stores are selected to reprobe in response to being retired. If multiple memory operations are selectable, LS2 control logic 66 may select the oldest one of the multiple memory operations. If LS2 control logic 66 is using port 0 (via port 0 mux 72), LS2 control logic 66 signals LS1 control logic 64, which selects the LS2 input through port 0 mux 72 and disables selecting a memory operation from LS1 buffer 60 on port 0 for that clock cycle.

LS2 control logic 66 is further coupled to receive snoop requests from bus interface unit 37 via snoop interface 52. Generally, memory operations in LS2 buffer 62 are snooped since they have probed data cache 28 and hence may need corrective action in response to the snoop operation. For example, load hits (which have forwarded data to dependent instructions) may need to be discarded and reexecuted. Stores may be storing a cache state from their probe, which may need to be changed. By contrast, memory operations within LS1 buffer 60 have not probed data cache 28 and thus may not need to be snooped.

LS2 control logic 66 receives the snoop request, examines the LS2 buffer entries against the snoop request, and responds to bus interface unit 37 via snoop interface 52. Additionally, LS2 control logic 66 may perform updates within LS2 buffer entries in response to the snoop.

Generally speaking, a buffer is a storage element used to store two or more items of information for later retrieval. The buffer may comprise a plurality of registers, latches, flip-flops, or other clocked storage devices. Alternatively, the buffer may comprise a suitably arranged set of random access memory (RAM) cells. The buffer is divided into a number of entries, where each entry is designed to store one item of information for which the buffer is designed. Entries may be allocated and deallocated in any suitable fashion. For example, the buffers may be operated as shifting first-in, first-out (FIFO) buffers in which entries are shifted down as older entries are deleted. Alternatively, head and tail pointers may be used to indicate the oldest and youngest entries in the buffer, and entries may remain in a particular storage location of the buffer until deleted therefrom. The term "control logic" as used herein, refers to any combination of combinatorial logic and/or state machines which performs operations on inputs and generates outputs in response thereto in order to effectuate the operations described.

It is noted that, in one embodiment, load/store unit 26 attempts to overlap store probes from LS1 with the data commit of an older store on the same port. This may be performed because the store probe is only checking the data cache tags for a hit/miss, and is not attempting to retrieve or update data within the data storage. It is further noted that, while the above description refers to an embodiment in which all memory operations are placed in LS2 buffer 62, other embodiments may not operate in this fashion. For example, load hits may not be stored in LS2 buffer 62 in some embodiments. Such embodiments may be employed, for example, if maintaining strong memory ordering is not desired.

Store to Load Forwarding

Figure 4:
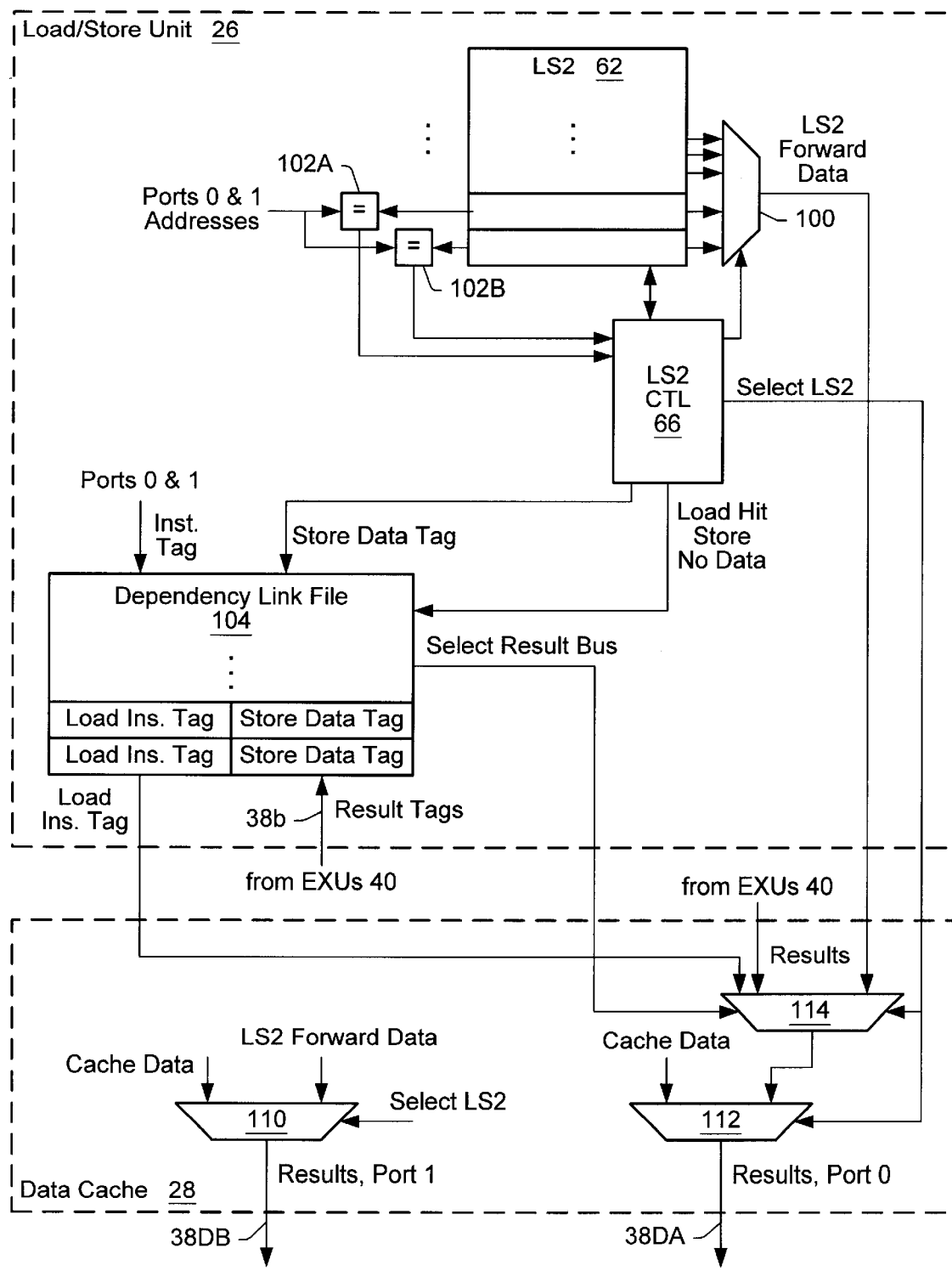
FIG. 4 is a block diagram of portions of one embodiment of a load/store unit and portions of one embodiment of a data cache.

FIG. 4 illustrates one embodiment of a portion of load/store unit 26 and data cache 28. Other embodiments are possible and contemplated. In the embodiment of FIG. 4, load/store unit 26 includes LS2 buffer 62, LS2 control logic 66, a data forward mux 100, address comparators 102A–102B, and a dependency link file 104. Additionally, in the embodiment of FIG. 4, data cache 28 includes a port 1 data mux 110, a port 0 data mux 112, and a LS2 forward data mux 114. LS2 buffer 62 is coupled to data forward mux 100, comparators 102A–102B, and LS2 control logic 66. LS2 control logic 66 is further coupled to muxes 100, 110, 112, and 114. LS2 control logic 66 is further coupled to dependency link file 104, and comparators 102A–102B. Dependency link file 104 is coupled to receive instruction tags corresponding to data cache ports 0 and 1 and to LS2 data forward mux 114. Comparators 102A–102B are coupled to receive data addresses presented on ports 0 and 1 of data cache 28. Dependency link file 104 is coupled to receive result tags on buses 38b. Mux 114 is coupled to mux 112. Mux 112 is coupled to provide results on result bus 38DA, and similarly mux 110 is coupled to provide results on result bus DB. Result buses 38DA–38DB may form one embodiment of result buses 38D as shown in FIG. 2.

Generally speaking, load/store unit 26 is configured to handle the cases in which a probing load memory operation hits an older store memory operation stored in LS2 buffer 62. Generally speaking, a load memory operation is said to "hit" a store memory operation if the load memory operation accesses bytes which are updated by the store memory operation. Load/store unit 26 compares data addresses of memory operations probing data cache 28 from LS1 buffer 60 to memory operations within LS2 buffer 62. If a probing load hits a store in LS2 buffer 62 and the store data is available with LS2 buffer 62, the store data is transmitted to data cache 28 for forwarding in place of any load data which may be in cache. On the other hand, a probing load may hit a store in LS2 buffer 62 for which store data is not available. For this case, forwarding of data from data cache 28 is cancelled and the load memory operation is selected for reprobing from LS2 buffer 62 until the store data becomes available (according to the scan mechanism described above). Eventually, the store data may become available within LS2 buffer 62 and forwarded therefrom during a reprobing by the load, or the store may update data cache 28 and the data may be forwarded from data cache 28 during a reprobing by the load. Finally, store memory operations which hit store memory operations in the buffer may cause the LIB bit for the hit store memory operations to be reset. The LIB bit for the probing store is set.

For loads probing from LS1 buffer 60, the LIB bits in LS2 buffer 62 are used to determine which store is the youngest store to update a memory location accessed by the load. Since the LIB bit is set for the youngest store and reset for older stores when the youngest store probes data cache 28, at most one entry in LS2 buffer 62 matches both the address of the load and has the LIB bit set. Accordingly, prioritizing among multiple hits is avoided. The logic for detecting hits may thereby be performed more rapidly, allowing for reduced load latency on load probes.

In order to simplify the determination of which store is hit by a load which reprobes from LS2 buffer 62, the store instruction tag of the store hit by the load upon initial probing from LS1 buffer 60 is recorded in the LS2 buffer entry of the load. During reprobings from LS2 buffer 62, instead of comparing the load data address to the store data addresses within LS2 buffer 62, the store instruction tag recorded for the load is compared to the store instruction tags within LS2 buffer 62. If the recorded store instruction tag matches a store instruction tag within LS2 buffer 62 and the store data is available, the store data is forwarded for the load in a manner similar to the initial probe case described above. Similarly, if the recorded store instruction tag matches a store instruction tag within LS2 buffer 62 and the store data is not available, forwarding is cancelled and the load is selected again for reprobing at a later time. If the recorded store instruction tag does not match a store instruction tag within LS2 buffer 62, the data is forwarded from data cache 28.

Generally speaking, store data is "available" from a storage location if the store data is actually stored in that storage location. If the data may at some later point be stored in the storage location but is not yet stored there, the data is "not available", "not yet available", or "unavailable". For example, store data may be not available in a LS2 buffer entry if the store data has not been transmitted from the source of the store data to the LS2 buffer entry. The source of the store data is the instruction which executes to produce the store data, and may be the same instruction to which the store corresponds (an instruction specifying a memory operand as the destination) or may be an older instruction. The store data tag identifies the source of the store data and hence is compared to result tags from the execution units 40 to capture the store data.

In the embodiment shown, load/store unit 26 uses dependency link file 104 to accelerate the forwarding of data when a load which hits a store for which the corresponding store data is not available is detected. In response to detecting such a load, load/store unit 26 allocates an entry in dependency link file 104 for the load. The dependency link file entry stores a load identifier (e.g. the instruction tag assigned by reorder buffer 32 to the instruction corresponding to the load) identifying the load which hits the store and a store data identifier (e.g. the store data tag) identifying the source of the store data corresponding to the store hit by the load. Load/store unit 26 monitors results buses 38 for the store data tags stored within dependency link file 104. Upon detecting that store data is being provided on one of result buses 38, load/store unit 26 directs data cache 28 to forward the data from the corresponding result bus onto a result bus from data cache 28. Additionally, the load identifier from the corresponding entry is forwarded as the result tag. In this manner, the store data is directly forwarded, during the clock cycle the store data is provided, to any operations dependent upon the load data. Advantageously, the latency from receiving store data to forwarding the store data to a previously probing load may be reduced. In one embodiment, the latency may be reduced to zero clock cycles. It is noted that dependency link file 104 is an entirely optional performance enhancement. Embodiments which do not employ dependency link file 104 are contemplated.

As described above, load addresses are compared to store addresses within LS2 buffer 62 to detect loads which hit older stores. Accordingly, comparators such as comparators 102 are provided. Comparators 102 are provided to compare addresses on each port of data cache 28 to the data addresses stored within LS2 buffer 62. As an example, one embodiment of data cache 28 includes two ports, each of which may receive a different load address during a clock cycle. Such an embodiment may include two comparators 102 for each LS2 buffer entry. For simplicity in the drawing, not all of the comparators 102 have not been illustrated. If an address on one of the ports to data cache 28 hits a data address within LS2 buffer 62, the corresponding comparator 102 asserts a signal to LS2 control logic 66. LS2 control logic 66 determines if the port is being used for a load, if the entry which is hit is a store, and whether or not the corresponding store data is available.

If a load hit on a store entry is detected and the corresponding store data is available, LS2 control logic 66 selects the store data using data forward mux 100, and provides the data to either LS2 data forward mux 114 or to port 1 mux 110, based upon the port for which the hit is detected. Accordingly, data forward mux 100 may comprise a set of independent muxes, one for each port. Additionally, LS2 control logic 66 asserts a corresponding signal to data cache 28 for data cache 28 to select the forwarded data in place of cache data read from data cache 28 for the hitting load.

If a load hit on a store is detected and the corresponding store data is not available, LS2 control logic 66 signals data cache 28 to cancel data forwarding. Additionally, LS2 control logic 66 signals dependency link file 104 that a load hitting a store with unavailable data has been detected. Additionally, LS2 control logic 66 reads the store data tag from the entry which is hit and provides the store data tag to dependency link file 104 (or alternatively causes LS2 buffer 62 to transmit the store data tag to dependency link file 104). At most one store is detected as being hit by a load using the LIB bit 96K (described below) or by comparing store instruction tags if the load is a reprobe from LS2 buffer 62.

Dependency link file 104 is also coupled to receive the instruction tags corresponding to the memory operations probing data cache 28 via ports 0 and 1. In response to the signal from LS2 control logic 66, dependency link file control logic 106 allocates an entry within dependency link file 104. The load instruction tag and the store data tag of the store hit by the load are stored into the allocated entry of dependency link file 104.

Dependency link file 104 monitors the result tags upon result buses 38 to detect the store data tags stored within dependency link file 104. Upon detecting equality between the store data tag of the corresponding entry and a result tag upon result tags buses 38b, Dependency link file 104 forwards the corresponding load instruction tag to mux 114. In addition, based upon the result bus from which the result tag matching the store data tag is received, dependency link file 104 signals data cache 28 to select the corresponding data (and the load instruction tag) through LS2 data forward mux 114 and through port 0 mux 112 onto port 0 result bus 38DA. In this manner, the store data is forwarded as load data for the corresponding load. Finally, dependency link file 104 deletes the entry for which data is forwarded from dependency link file 104, allowing for a subsequent load to be allocated to that entry.

In one embodiment, dependency link file 104 is used to forward load data if the following conditions are met: (i) the load address and the store address which is hit match exactly (i.e. identify the same byte); and (ii) the store size is equal to or greater than the load size (i.e. the store updates every byte accessed by the load). Other embodiments may employ more or fewer restrictions, as desired.

In the present embodiment, load/store unit 26 uses port 0 of data cache 28 to forward the load data for a load represented in dependency link file 104. Accordingly, upon detecting that load data is to be forwarded, dependency link file 104 may signal LS1 control logic 64 and LS2 control logic 66. Control logics 64 and 66 may inhibit selecting an operation for port 0 and may stall the port 0 pipeline to allow use of port 0 result bus 38DA by dependency link file 104.

If LS2 control logic 66 determines that a store upon one of data cache ports 0 and 1 hits an older store, the LIB bit for the older store is reset. The LIB bit for the store on the data cache port is set upon storing of the entry into LS2 buffer 62. Finally, if LS2 control logic 66 determines that a store hits an older load, the hit detected by comparators 102 is ignored.

It is further noted that, while the present embodiment is shown for use with LS2 buffer 62, other embodiments are contemplated in which the above store forwarding mechanism is performed with a conventional store queue storing only store memory operations which have probed data cache 28. It is still further noted that, while muxes 110, 112, and 114 are shown within data cache 28, this circuitry may be employed within load/store unit 26, as desired.

Figure 5:
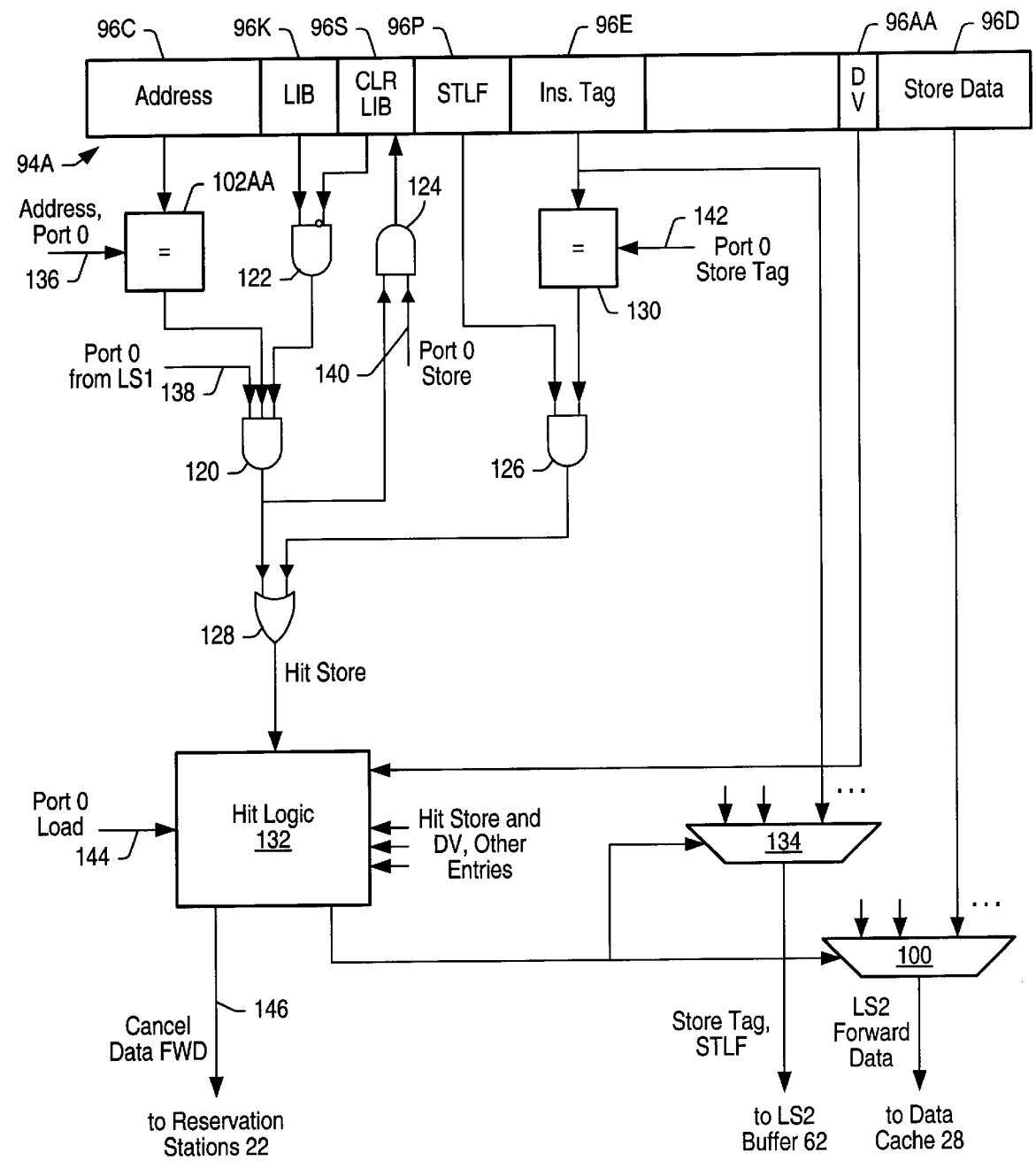
FIG. 5 is a block diagram illustrating a portion of one embodiment of control logic illustrated in FIG. 4.

Turning now to FIG. 5, a block diagram of a portion of one embodiment of control logic 66 and an LS2 entry 94A is shown. Other embodiments and specific implementations are contemplated. The embodiment of FIG. 5 includes: a comparator 102AA; AND gates 120, 122, 124, and 126; OR gate 128; comparator 130; hit logic 132; data forward mux 100; and a store instruction tag mux 134. Comparator 102AA is coupled to receive the data address from port 0 (reference numeral 136) and to receive the data address stored in address field 96C of entry 94A. Comparator 102AA provides a output to AND gate 120, which is further coupled to receive a Port 0 from LS1 signal (reference numeral 138) and the output of AND gate 122, which is coupled to receive the LIB field 96K and the clear LIB field 96S as inputs. The output of AND gate 120 is coupled as an input to OR gate 128 and AND gate 124, which further receives a port 0 store signal (reference numeral 140). OR gate 128 is further coupled to receive input from the output of AND gate 126, which is coupled to receive the output of comparator 130 and the value in store to load forward (STLF) bit 96P. Comparator 130 is coupled to receive the contents of instruction tag field 96E and is coupled to receive a Port 0 store tag (reference numeral 142). The output of OR gate 128 is coupled as a hit store signal to hit logic 132. Hit logic 132 is further coupled to receive a data valid bit from data valid field 96AA (part of valid field 96A shown in FIG. 12). Similar hit store and data valid signals corresponding to other entries may be received by hit logic 132 as well. Hit logic 132 is coupled to receive a port 0 load signal (reference numeral 144), and is coupled to provide a cancel data FWD signal to reservation stations 22 (reference numeral 146) and selection controls to muxes 100 and 134. Mux 134 is coupled to receive the instruction tag from instruction tag field 96E (and tags from other LS2 buffer entries). Mux 100 is coupled to receive the store data from store data field 96D (and store data from other LS2 buffer entries).

Generally, the logic illustrated in FIG. 5 may detect a hit on a store in entry 94A by a load on port 0. Similar logic may be employed with respect to port 1 and entry 94A, and with respect to both ports for other entries. AND gates 120 and 122 and comparator 102AA may be used in the detection of a load probing from LS1 buffer 60 which hits a store in entry 94A. On the other hand, comparator 130 and AND gate 126 may be used in the detection of a load reprobing from LS2 buffer 62 which hits a store in entry 94A. OR gate 128 combines the results of the two detections to generate a hit store signal corresponding to entry 94A and port 0.

More particularly, comparator 102AA compares the data address on port 0 to the address in address field 96C. If the addresses match, comparator 102AA asserts its output signal. AND gate 122 determines if the LIB indication identifies entry 94A as the last in LS2 buffer 62 to update the address in address field 96C. In the present embodiment, LIB bit 96K is set in response to the placing of the store into entry 94A. Upon determining that a younger store to the same address has been stored into LS2 buffer 62, the clear LIB bit 96S is set. Accordingly, entry 94A corresponds to the last store in LS2 buffer 62 to update the address in address field 96C if the LIB bit 96K is set and the clear LIB bit 96S is clear. Other embodiments may invert the binary sense of bits 96K and 96S, as desired. Furthermore, other embodiments may reset LIB bit 96K instead of providing clear LIB bit 96S. Such embodiments may eliminate AND gate 122. If the data addresses match (comparator 102AA has asserted its output signal) and the LIB indication is in a last-in-buffer state for entry 94A (AND gate 122 has asserted its output signal), then the memory operation on port 0 is hitting a store in entry 94A which is currently last in buffer to update the address in address field 96C.

The LIB indication is an accurate indication for loads and stores probing from LS1 buffer 60, but may be inaccurate for reprobes from LS2 buffer 62. For example, entry 94A may correspond to a store which is subsequent to a reprobing load in program order. Accordingly, AND gate 120 qualifies the asserted signals from AND gate 122 and comparator 102AA with an indication that the memory operation on port 0 is a probe from LS1 buffer 60 (and not a reprobe from LS2 buffer 62). The indication is provided in the form of port 0 from LS1 signal 138 (which may be generated by LS2 control logic 66 by examining buffer entries or by LS1 control logic 64 in response to selecting an LS1 buffer entry to probe on port 0, for example). If AND gate 120 receives three asserted input signals, it asserts its output signal and a load hit store has been detected.

As mentioned above, since a load reprobing from LS2 buffer 62 may be followed by a store to the same address as the load, the LIB indication may be unreliable for reprobes. Accordingly, an additional mechanism may be used for detecting load hit store cases for reprobing loads may be employed. In response to detecting a load hit store for which data is unavailable, hit logic 132 sets the STLF bit 96P of both the LS2 buffer entry allocated to the load and entry 94A. The STLF bit 96P in the load entry indicates that a load hit store was detected on the probe and that the store data was unavailable (and hence a store instruction tag was captured in the store data field 96D of the load entry). The STLF field 96P in the store entry indicates that a load hit the store and data was unavailable. Alternatively, STLF field 96P may be used as a last in buffer indication with respect to the corresponding store instruction tag, if an implementation allows multiple entries to have the same store instruction tag.

During a reprobe of a load for which the STLF bit 96P is set, the store tag captured in the store data field of the load entry is provided to LS2 buffer 62. For example, the store instruction tag may be transmitted on the port. Alternatively, LS2 control logic 66 may mux the store instruction tag out of the entry locally using the pipe field described in FIG. 12 below. Comparator 130 receives the store instruction tag corresponding to the load (reference numeral 130) and compares the store instruction tag to the instruction tag in instruction tag field 96E of entry 94A. If the tags match, comparator 130 asserts its output signal. AND gate 126 determines a hit for the reprobe case by combining the output of comparator 130 and STLF bit 96P. Alternatively, LS2 control logic 66 may be configured not to set the STLF bit 96P in entry 94A and AND gate 126 may be eliminated. Alternatively, such an embodiment may include a Port 0 from LS2 signal indicating that the memory operation on port 0 is from LS2 buffer 62. The Port 0 from LS2 signal may be an input to AND gate 126 to qualify the output signal of comparator 130. It is noted that the logic for detecting load hit store when the load is a reprobe from LS2 buffer 62 (e.g. comparator 130 and AND gate 126) may not be employed in the embodiment of FIG. 3 for port 1, since reprobes are restricted to port 0 in that embodiment.

OR gate 128 combines the results of AND gate 120 (determining load hit store for load probes from LS1 buffer 60) and AND gate 126 (determining load hit store for load reprobes from LS2 buffer 62) to generate a hit store signal corresponding to port 0 and entry 94A. Hit logic 132 receives the hit store signal, as well as similar hit store signals corresponding to other LS2 buffer entries (and corresponding data valid bits 96AA from the other entries).

Hit logic 132 combines the hit store signal corresponding to entry 94A and other hit store signals corresponding to port 0 to generate data forwarding signals for the memory operation on port 0. Since at most one hit store signal is asserted, hit logic 132 need not qualify hit signals with the order of stores in LS2 buffer 62 or perform other hit prioritization tasks. In the present embodiment, hit logic 132 may detect two cases for loads (indicated by Port 0 load signal 144): (i) hit store signal asserted and the corresponding data valid bit 96AA is set; and (ii) hit store signal asserted and the corresponding data valid bit 96AA is clear. If no hit store signal is asserted or the memory operation on port 0 is not a load (as indicated by Port 0 load signal 144), then hit logic 132 is idle for that memory operation. Similar hit logic may be employed for the memory operation on port 1, in the present embodiment.

For case (i), a load hit store is detected and the corresponding store data is valid. Hit logic 132 generates mux select signals for data forward mux 100, causing data forward mux 100 to select the store data from store data field 96D of the LS2 buffer entry corresponding to the asserted hit store signal. For example, if the hit store signal generated by OR gate 128 is asserted, hit logic 132 causes mux 100 to select store data from store data field 96D from entry 94A. The selected data is forwarded by data cache 28 as described above for FIG. 4. It is noted that the mux select signal for selecting store data field 96D from entry 94A may be generated by ANDing the hit store signal and the data valid signal. Other selects corresponding to other entries may be generated similarly. Accordingly, hit logic 132 may rapidly generate the control signals since hit prioritization is eliminated.

For case (ii), a load hit store is detect and the corresponding store data is not valid. Accordingly, hit logic 132 asserts cancel data FWD signal 146 to reservation stations 22, informing the reservation stations 22 to ignore data forwarded for the load on port 0 during that clock cycle. Furthermore, hit logic 132 generates mux select signals for store instruction tag mux 134. Hit logic 132 causes store instruction tag mux 134 to select the instruction tag from instruction tag field 96E of the LS2 buffer entry corresponding to the asserted hit store signal. For example, if the hit store signal generated by OR gate 128 is asserted, hit logic 132 causes mux 134 to select the instruction tag from instruction tag field 96E of entry 94A. The selected instruction tag is provided back to LS2 buffer 62, and control logic 66 stores the instruction tag in the store data field 96D of the LS2 buffer entry storing the load. Additionally, the STLF bits 96P of the LS2 buffer entry storing the load and of the LS2 buffer entry storing the store which is hit are set. It is noted that the mux select signal for selecting store data field 96D from entry 94A may be generated by ANDing the hit store signal and the inverse of the data valid signal. Other selects corresponding to other entries may be generated similarly. Accordingly, hit logic 132 may rapidly generate the control signals since hit prioritization is eliminated.

AND gate 124 is provided to change the state of the LIB indication to indicate the store in entry 94A is not the last in buffer to update the address in address field 96A. The LIB indication is changed if the address on port 0 hits the address in address field 96A and the memory operation on port 0 is a store probing from LS1 buffer 60. AND gate 124 receives the output of AND gate 120 (indicating, when asserted, that a hit has been detected for a probe from LS1 buffer 60) and Port 0 store signal 140 indicating, when asserted, that the memory operation on port 0 is a store. If a probing store hits the address in address field 96C, AND gate 124 sets the clear LIB bit 96S.

It is noted that the above description refers to a probe or reprobe address matching the address in address field 96C. As used herein, an address matches another address if the addresses identify the same memory location or locations. In one embodiment, the addresses on the data cache ports may be virtual addresses and the address in field 96C may be a physical address. For such embodiments, comparator 102AA may only compare the index portion of the addresses, and rely on the store and load hitting in the same way of data cache 28 to verify that the addresses actually match. In such an embodiment, entry 94A may store the way of data cache 28 which the store hits, and the way may be compared to the way in data cache 28 that the load hits to detect an address match. In other embodiments, the physical address of memory operations on the data cache ports may be available in time to perform the address comparison.

In one particular embodiment, store to load forwarding from LS2 buffer 62 is performed only if a store updates each byte accessed by the load. For such embodiments, hit logic 132 may receive size information regarding the load and the store which is hit, and may select data to be forwarded via mux 100 only if each byte accessed by the load is available in the store data. If a load hits a store but the store does not up date each byte accessed by the load, then the load is not completed until the store updates data cache 28 and the data for the load is forwarded from data cache 28.

It is noted that the logic illustrated in FIG. 5 is exemplary only. Any suitable combinatorial logic (including any boolean equivalents of the logic shown) may be employed. It is further noted that entry 94A is an exemplary LS2 buffer entry. Entry 94A may store additional information above what is shown in FIG. 5. For example, entry 94 shown in FIG. 12 below may comprise entry 94A.

Figure 6:
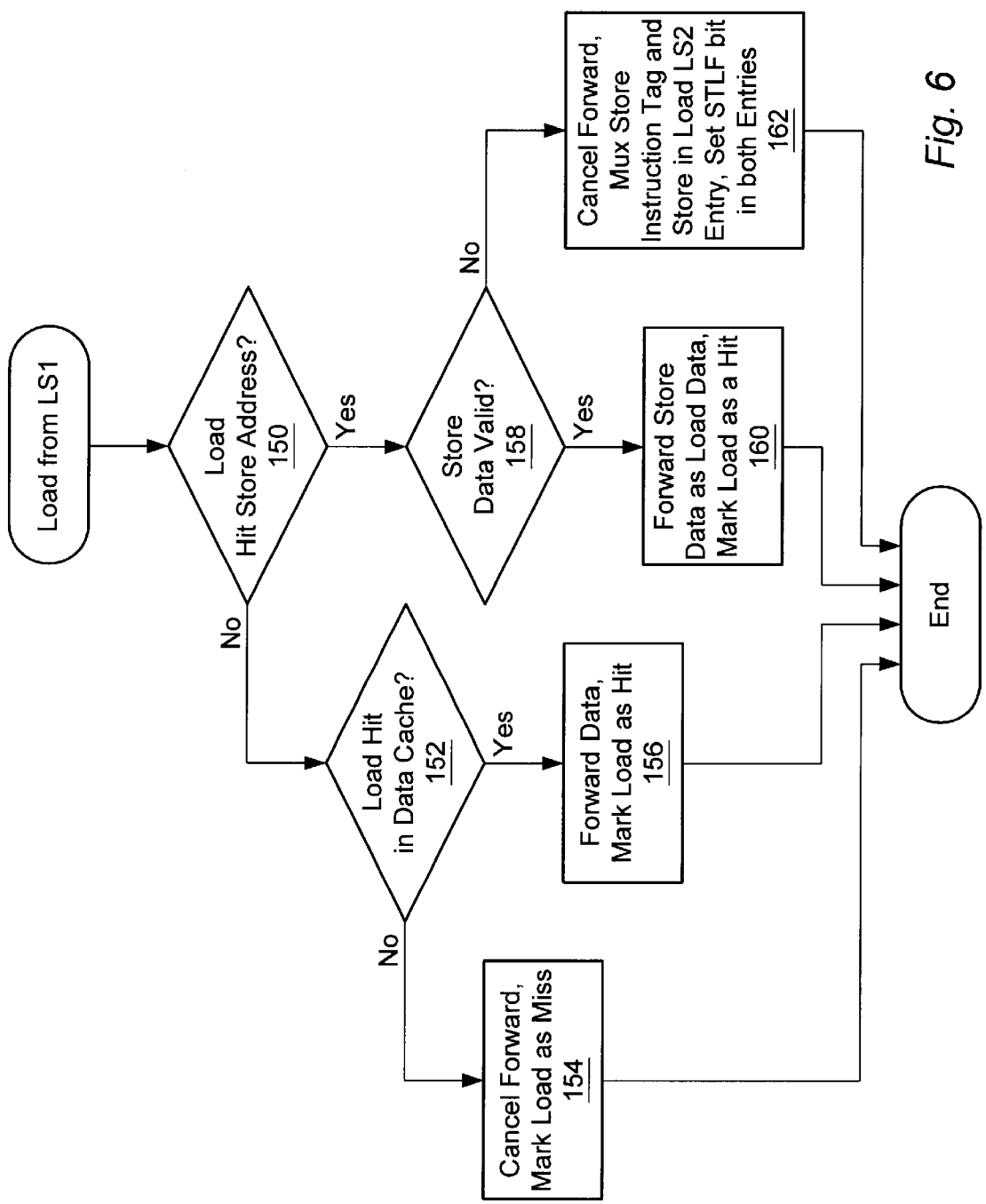
FIG. 6 is a flowchart illustrating operation of one embodiment of the control logic illustrated in FIGS. 4 and 5 in response to a load memory operation from an LS1 buffer shown in FIG. 3.

Turning next to FIG. 6, a flowchart is shown illustrating the operation of one embodiment of LS2 control logic 66 during a load probing from LS1 buffer 60. Other embodiments are possible and contemplated. While the steps shown in FIG. 6 are illustrated in a serial order for ease of understanding, any suitable order may be used. Particularly, steps may be performed in parallel by combinatorial logic within LS2 control logic 66.

LS2 control logic 66 determines if the load hits a store within LS2 buffer 62 (decision block 150). As mentioned above, a load hits a store if the addresses match and the LIB indication corresponding to the store is in a state indicating that the store is the last in LS2 buffer 62 to update the address. If the load does not hit a store, then LS2 control logic 66 determines if the load is a hit in data cache 28 (decision block 152). LS2 control logic 66 receives hit/miss signals on lines 82 in FIG. 3, for example, and may determine hit/miss status for the load from the hit/miss signals. If the load is a miss, LS2 control logic 66 may cancel the data forwarded by data cache 28 (e.g. by asserting cancel data FWD signal 146 or a similar signal), and marks the load as a miss in LS2 buffer 62 (step 154). On the other hand, if the load is a hit, LS2 control logic 66 may validate the load data forwarded (e.g. by deasserting the cancel data FWD signal 146 or a similar signal) and marks the load as a hit in LS2 buffer 62 (step 156).

If, at decision block 150, LS2 control logic 66 determines that the load does hit a store in LS2 buffer 62, LS2 control logic 66 determines if the corresponding store data is valid (decision block 158). If the store data is valid, LS2 control logic 66 forwards the store data as load data (e.g. by controlling muxes 110, 112, 114, and 100 shown in FIGS. 4 and 5) and marks the load as a hit in LS2 buffer 62 (step 160). If the store data is not valid, LS2 control logic 66 cancels the forwarding of data for the load (e.g. by asserting the cancel data FWD signal 146), selects the store instruction tag from the LS2 buffer entry hit by the load and stores the tag in the LS2 entry assigned to the load, and sets the STLF bit in both entries (step 162).

Figure 7:
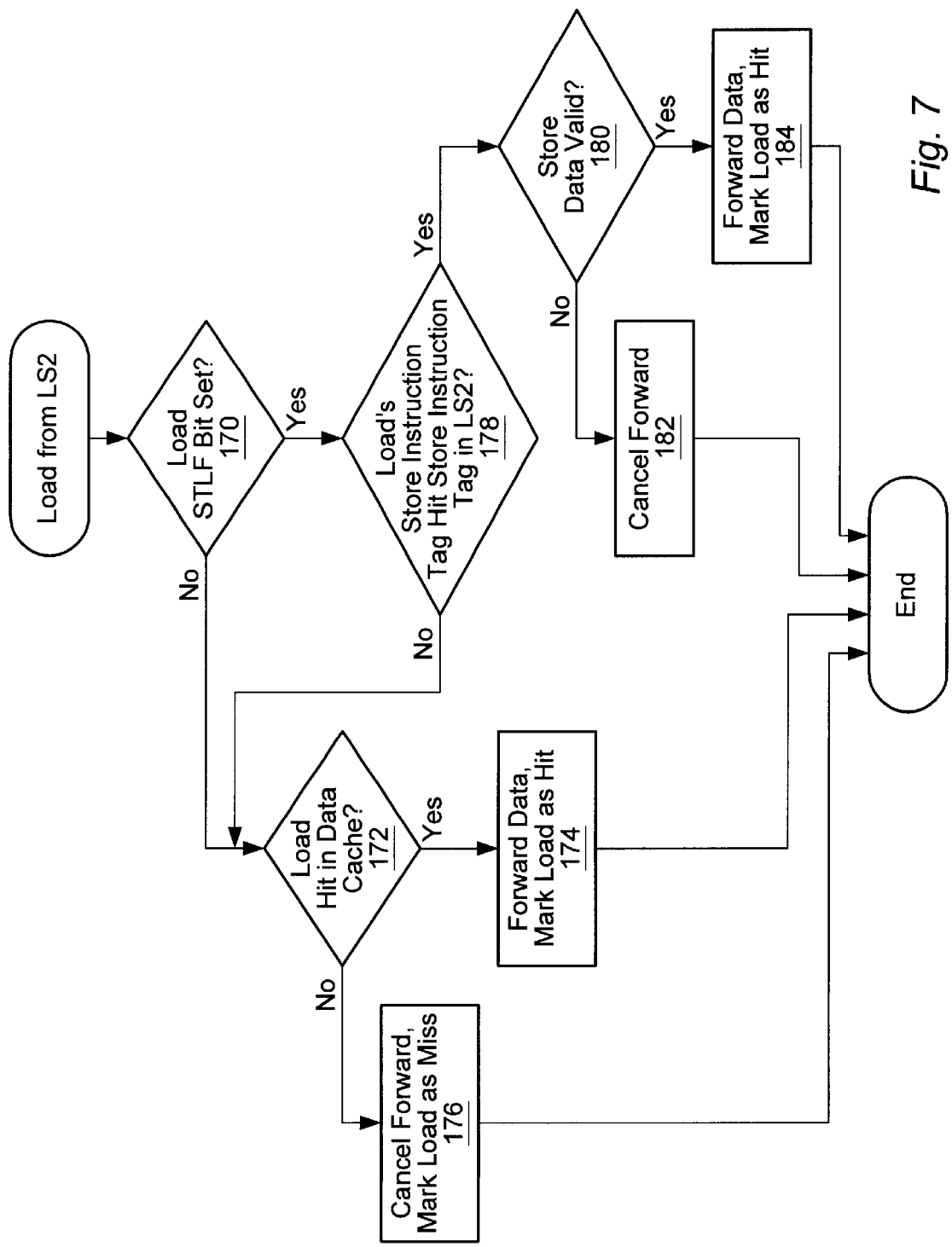
FIG. 7 is a flowchart illustrating operation of one embodiment of the control logic illustrated in FIGS. 4 and 5 in response to a load memory operation from an LS2 buffer shown in FIGS. 3 and 4.

Turning next to FIG. 7, a flowchart is shown illustrating the operation of one embodiment of LS2 control logic 66 during a load reprobing from LS2 buffer 62. Other embodiments are possible and contemplated. While the steps shown in FIG. 7 are illustrated in a serial order for ease of understanding, any suitable order may be used. Particularly, steps may be performed in parallel by combinatorial logic within LS2 control logic 66.

LS2 control logic 66 examines the STLF bit in the LS2 buffer entry corresponding to the load (decision block 170). If the STLF bit is clear, then no store to load forwarding is detected for the load. Accordingly, LS2 control logic 66 determines if the load is a hit in data cache 28 (decision block 172). If the load is a hit, the data is forwarded by data cache 28 and LS2 control logic 66 marks the load as a hit in LS2 buffer 62 (step 174). On the other hand, if the load is a miss, data forwarding is cancelled and the load remains marked as a miss in LS2 buffer 62 (step 176).

If the load's STLF bit is set (decision block 170), LS2 control logic 66 selects the store instruction tag stored in the LS2 buffer entry assigned to the load via step 162 above, and compares the store instruction tag to store instruction tags within LS2 buffer 62 (decision block 178). If the store instruction tag does not hit a store instruction tag in the buffer (e.g. because the store completed after the load's previous probing or reprobing), then LS2 control logic 66 processes the load as a non-load-hit-store case (beginning with decision block 172). However, if the load's store instruction tag does hit a store instruction tag within LS2 buffer 62, LS2 control logic 66 determines if the corresponding store data is valid (decision block 180). If the store data is valid, the data is forwarded and LS2 control logic 66 marks the load as a hit in LS2 buffer 62 (step 184). If the store data is not valid, LS2 control logic 66 asserts cancel data FWD signal 146 and the data is not forwarded (step 182). The load remains marked as a store load forward case in LS2 buffer 62 and may subsequently be selected for reprobing again.

Figure 8:
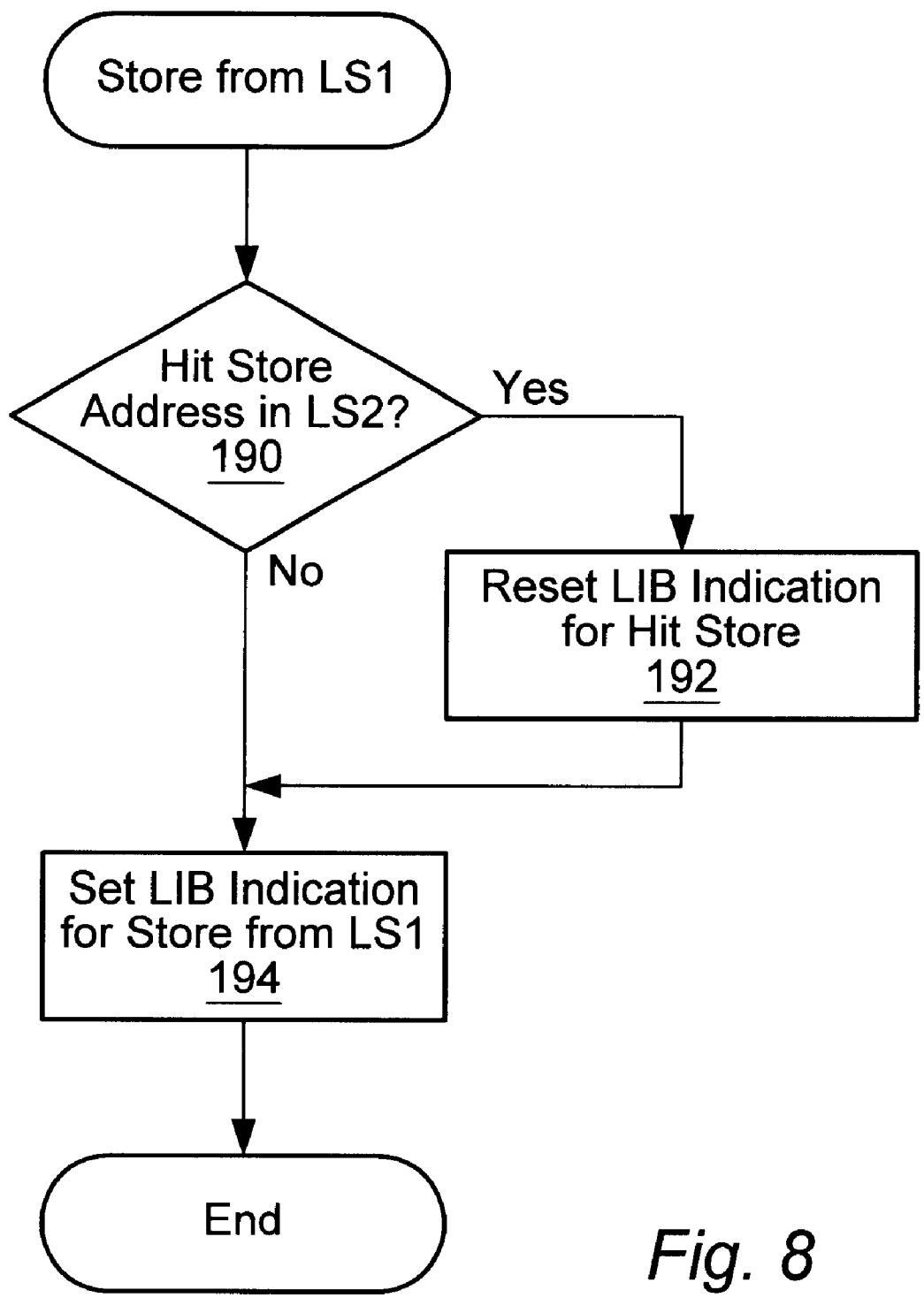

Turning now to FIG. 8, a flowchart is shown illustrating the operation of one embodiment of LS2 control logic 66 during a store probing from LS1 buffer 60. Other embodiments are possible and contemplated. While the steps shown in FIG. 8 are illustrated in a serial order for ease of understanding, any suitable order may be used. Particularly, steps may be performed in parallel by combinatorial logic within LS2 control logic 66.

LS2 control logic 66 determines if the store hits a store in LS2 buffer 66 (decision block 190). If the store hits an older store, LS2 control logic 66 resets the LIB indication for the older store to indicate that the store is not last in LS2 buffer 62 to update the address (step 192). In either case, the LIB indication for the probing store is set as the probing store is allocated into LS2 buffer 62 (step 194).

Additional Details, One Embodiment of Load/Store Unit

Figure 9:
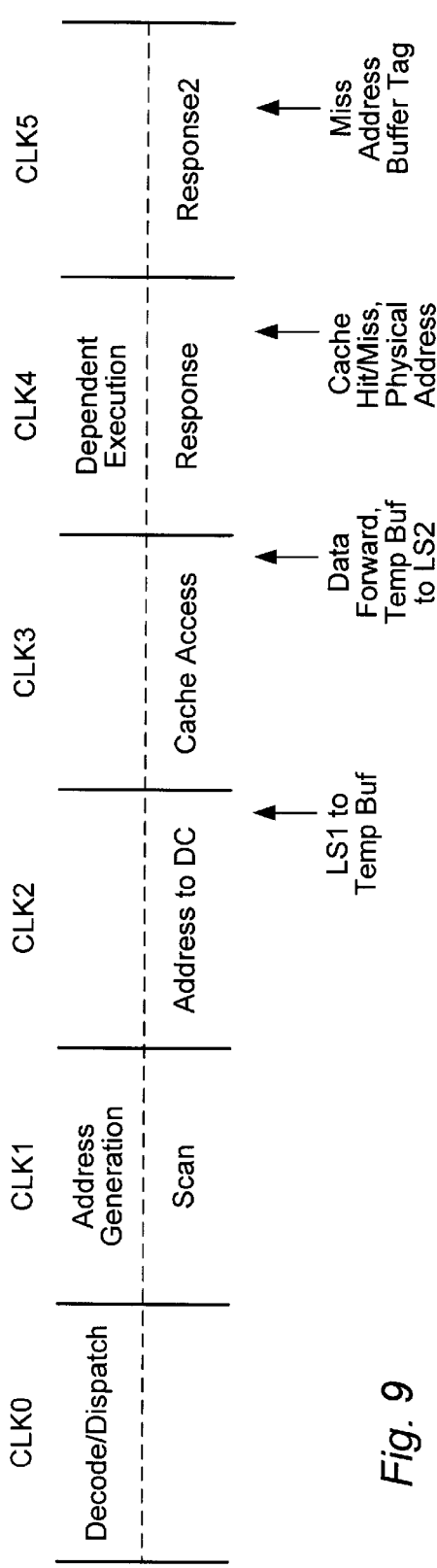
FIG. 9 is a timing diagram illustrating an exemplary pipeline for memory operations selected from the LS1 buffer shown in FIG. 3 to access the data cache.

Turning next to FIG. 9, a timing diagram is shown illustrating an exemplary pipeline for a memory operation probing data cache 28 from LS1 buffer 60. Other embodiments employing different pipelines are possible and contemplated. In FIG. 9, clock cycles are delimited by vertical solid lines. A horizontal dashed line is shown as well. Pipeline stages related to other portions of processor 10 are shown to illustrate the interface of other elements to load/store unit 26.

Clock cycle CLK0 is the decode/dispatch cycle for an instruction specifying the memory operation. During clock cycle CLK0, the decode unit 20 decoding the instruction signals load/store unit 26 regarding the memory operation. LS1 control logic 64 allocates an LS1 buffer entry for the memory operation during the decode/dispatch stage for the corresponding instruction. Additionally, the decode unit 20 transmits the decoded instruction to the corresponding reservation station 22.

During clock cycle CLK1, the address generation unit generates the data address for the memory operation and transmits the data address to load/store unit 26. During this clock cycle, the memory operation participates in the scan performed by LS1 control logic 64 (by virtue of the data address being provided) and is selected to probe data cache 28. Accordingly, the memory operation is in the scan pipeline stage of the LS1 pipeline.

During clock cycle CLK2, the data address is transmitted to data cache 28. As illustrated by the arrow within clock cycle CLK2, the memory operation is moved from LS1 buffer 60 to temporary buffer 68 at the end of clock cycle CLK2. The memory operation is in the address to data cache stage of the LS1 pipeline during clock cycle CLK2.

During clock cycle CLK3, the data address accesses data cache 28. Data corresponding to the memory operation (if the memory operation is a load) is forwarded at the end of clock cycle CLK3. Additionally, the memory operation is moved from temporary buffer 68 to LS2 buffer 62. The memory operation is in the cache access stage during clock cycle CLK3.

During clock cycle CLK4, an instruction dependent upon the memory operation (if the memory operation is a load) may be executed. Accordingly, the pipeline illustrated in FIG. 9 provides for a three clock cycle address generation to dependent operation execution load latency. Additionally, the memory operation is in the response pipeline stage during clock cycle CLK4. Data cache 28 provides hit/miss information and the physical address during the response stage. Accordingly, LS2 control logic 66 associates hit/miss information and the physical address with a memory operation in the response stage.

During clock cycle CLK5, the memory operation is in a response2 pipeline stage. During this stage, the miss address buffer tag identifying the miss address buffer entry assigned to the cache line accessed by the memory operation (if the memory operation is a miss) is provided by data cache 28. Accordingly, LS2 control logic 66 associates a MAB tag received from data cache 28 with a memory operation in the response2 stage.

Figure 10:
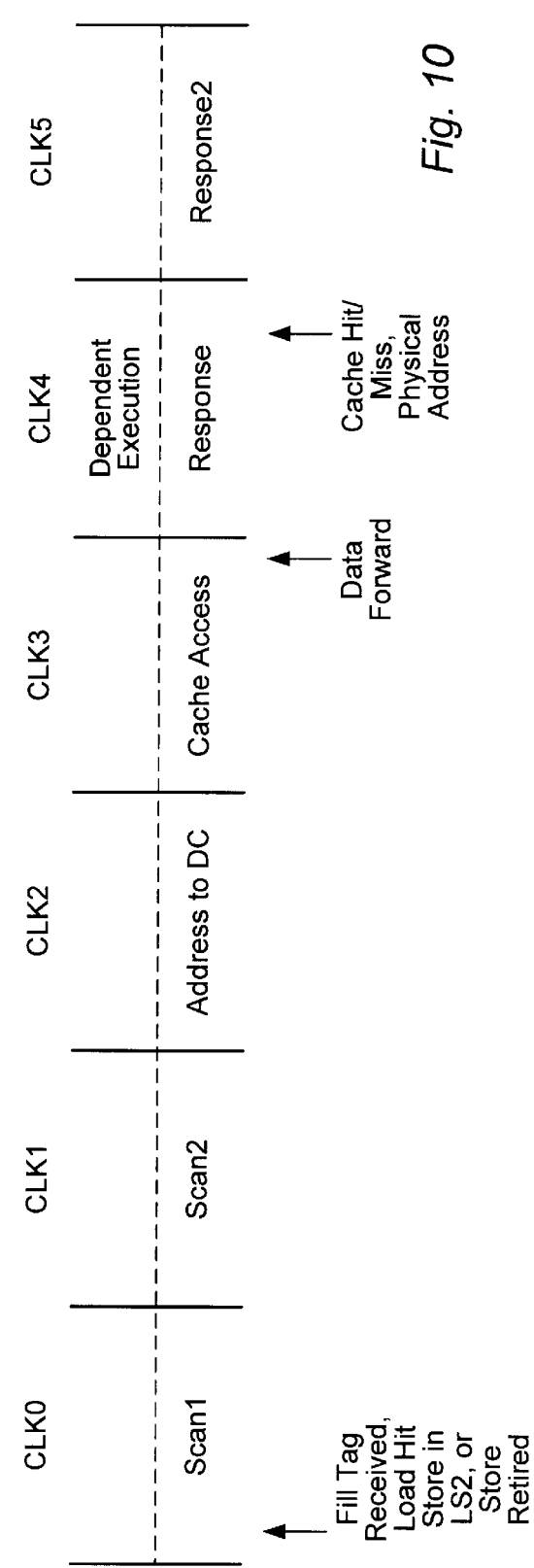
FIG. 10 is a timing diagram illustrating an exemplary pipeline for memory operations selected from the LS2 buffer shown in FIG. 3 to access the data cache.

Turning next to FIG. 10, a timing diagram illustrating an exemplary pipeline for a memory operation reprobing data cache 28 from LS2 buffer 62 is shown. Other embodiments employing different pipelines are possible and contemplated. In FIG. 10, clock cycles are delimited by vertical solid lines. A horizontal dashed line is shown as well. Pipeline stages related to other portions of processor 10 are shown to illustrate the interface of other elements to load/store unit 26.

During clock cycle CLK0, the memory operation participates in a scan of LS2 buffer entries and is selected to reprobe data cache 28. As illustrated by the arrow beneath clock cycle CLK0, the memory operation may be selected if a fill tag matching the MAB tag for the memory operation is received, if the memory operation is a load which hits an older store within LS2 buffer 62 (for which the data was not available on the previous probe), or if the memory operation is a store which has been retired by reorder buffer 32.

During clock cycle CLK1, the memory operation selected during the Scan1 stage enters the Scan2 stage. During the Scan2 stage, the memory operation is selected through muxes 76 and 72 for transmission to data cache 28. Accordingly, LS2 control logic 66 selects the memory operation in the Scan2 stage through multiplexor 76. Clock cycles CLK2, CLK3, CLK4, and CLK5 are the address to data cache, cache access, response, and response2 stages of the LS2 buffer reprobe pipeline and are similar to the corresponding stages described above. Accordingly, for the present embodiment, bus interface unit 37 may provide the MAB tag 4 clocks prior to providing the corresponding data, to allow selection of a load which accesses that corresponding fill data to be in the cache access stage during the clock cycle in which the fill data arrives at data cache 28 (and hence the fill data may be forwarded).

It is noted that the timing between the instruction pipeline stages above the dotted lines in FIGS. 9 and 10 and the memory operation pipeline stages below the dotted lines may be extended from those shown in FIGS. 9 and 10. For example, in FIG. 9, the address may not be generated exactly in the clock cycle immediately following the decode/dispatch cycle. Operands may not be available, or older instructions may be selected for address generation instead. Furthermore, a memory operation may not be scanned for access during the clock cycle the address is provided, as other older memory operations may be scanned instead.

Turning next to FIG. 11, a block diagram illustrating exemplary information which may be stored in one embodiment of an LS1 buffer entry 90 is shown. Other embodiments are possible and contemplated.

LS1 buffer entry 90 includes a valid field 92A which indicates the validity of the entry as well as certain fields within the entry. For example, valid field 92A may comprise a valid bit indicating whether or not the entry is valid, a data valid bit indicating whether or not store data is valid (if applicable), and an address valid bit indicating whether or not the data address is valid.

Type field 92B stores the type of memory operation represented within LS1 buffer entry 90. The memory operation may be a load, a store, or a load/store (for load-op-store instruction as may occur in the x86 instruction set architecture). Load/store types may probe data cache 28 once, and forward the data based on the probe, then subsequently perform the store when the instruction is retired. Accordingly, load/store types may occupy a single entry for both the load and the store memory operations.

Address field 92C stores the data address of the memory operation, and store data field 92D stores the store data corresponding to a store memory operation. Instruction tag field 92E stores the instruction tag assigned by reorder buffer 32 to the instruction corresponding to the memory operation. The instruction tag is used to capture the data address from address buses 44. Additionally, the instruction tag may be used to determine when the corresponding instruction is retired by reorder buffer 32 and may be used for loads as the result tag for forwarding data Data tag field 92F stores the store data tag identifying the source of the store data for a store memory operation.

The address valid bit within valid field 92A indicates if address field 92C is valid. However, the data address may be provided by AGUs 42 and be selected for probing data cache 28 prior to the data address becoming valid in LS1 buffer entry 90. ATagM field 92G is used to indicate that the address tag provided by AGUs 42 in the previous clock cycle matched instruction tag field 92E for providing selection controls for port 0 mux 72 and port 1 mux 74. In one embodiment, ATagM field 92G may comprise a bit for each issue position to identify the issue position from which the data address is received. Accordingly, ATagM field 92G may be used to determine which LS1 entry should capture an address presented to LS1 buffer 60 from one of segment adders 70.

As illustrated in FIG. 9, removing an entry from LS1 buffer 60 may be delayed from the clock cycle in which the entry is selected for probing. Accordingly, accessed bit 92H is provided within LS1 buffer entry 90. Accessed bit 92H may be set to indicate that the memory operation was selected in the previous clock cycle for probing, and therefore should not be selected in the present clock cycle. Certain types of memory operations may be predetermined to be performed non-speculatively according to the instruction set architecture employed by processor 10 or according to design choice. Non-speculative bit 92I may be used to indicate such a memory operation.

Finally, a general control field 92J may be included for additional control bits as desired. For example, an embodiment of processor 10 employing the x86 instruction set architecture may include control information specific to the x86 architecture within control field 92J. For example, information related to the accessed segment, segment limit violations, and segment attributes may be stored in control field 92J. Furthermore, information such as the size of the memory operation (i.e. number of contiguous bytes affected by the memory operation) may be included, as may be any other desired control information according to design choice.

Turning next to FIG. 12, a block diagram illustrating exemplary information which may be stored in one embodiment of an LS2 buffer entry 94 is shown. Other embodiments are possible and contemplated.

LS2 buffer entry 94 includes a valid field 96A which indicates the validity of the entry as well as certain fields within the entry. For example, valid field 92A may comprise a valid bit indicating whether or not the entry is valid, a data valid bit indicating whether or not store data is valid (if applicable), and a physical address valid bit indicating whether or not the physical data address is valid (i.e. whether or not a valid translation has been performed by data cache 28).

LS2 buffer entry 94 further includes a type field 96B, an address field 96C, a store data field 96D, an instruction tag field 96E, and a data tag field 96F similar to the fields 92B–92F described above. Additionally, a portion of store data field 96D may be used in the case of a load which hits an older store within LS2 buffer 62. For these cases, the store instruction tag of the store which the load hits is stored into store data field 96D of the load entry. For subsequent reprobes, the older store can be located by comparing the store instruction tag instead of trying to scan for the address and prioritize the hits. LS2 buffer 94 further includes a nonspeculative bit 96L similar to nonspeculative bit 92I described above.

MAB tag field 96G stores the MAB tag assigned by data cache 28 for a memory operation which misses. Similar to the accessed bit 92H, accessed bit 96H indicates that LS2 buffer entry 94 has been selected to access data cache 28 and is not currently eligible for selection. Additionally, LS2 buffer entry 94 includes a pipe field 96I which tracks the pipe stage occupied by the memory operation stored in the entry after it has been selected. Pipe field 96I may, for example, comprise a bit for each pipe stage. The bit for the first pipe stage may be set in response to selecting the memory operation in the entry, and then the field may be shifted each clock cycle as the memory operation progresses through the pipeline. Alternatively, an encoded value may be used. Information received from data cache 28 may be associated with the corresponding memory operation by scanning pipe fields 96I for a memory operation which is in the pipe stage at which the information is generated.

As mentioned above, memory operations may remain in LS2 buffer 62 after being retired by reorder buffer 32. Retired bit 96J is used to identify the entry as corresponding to an instruction which has been retired. Additionally, LS2 buffer entry 94 includes an last in buffer (LIB) bit 96K. LIB bit 96K is used when comparing stores within LS2 buffer 62 to loads probing data cache 28 for the first time. The last in buffer bit indicates that the store within the corresponding entry is the last (e.g. youngest) entry within the buffer to update the data address specified by that store. Accordingly, in the case in which multiple stores within the buffer are hit by a load, the store with the LIB bit set is selected as the store upon which the load is dependent. Complex hit prioritization logic may thereby be avoided. The same comparator circuitry used to compare probing loads against LS2 buffer 62 may be used to compare probing stores as well. If a probing store hits a store in LS2 buffer 62 for which LIB bit 96K is set, the LIB bit 96K is reset. Alternatively, a second bit may be set and interpreted as resetting LIB bit 96K. LIB bit 96K is set for a store buffer entry as the store buffer entry is allocated.

Miss bit 96M is used to identify whether or not the memory operation stored in LS2 buffer entry 94 is a miss in data cache 28. Miss bit 96M is set according to the hit/miss information provided by data cache 28 on hit/miss lines 82 (either on initial probe or reprobe). Additionally, LS2 buffer entry 94 includes a self-modifying code (SMC) field 96N. Snoop resync bit 96O is used to indicate synchronization due to snoops. Store load forward bit 96P is used to signify that the current entry is a load which hits an older store within LS2 buffer 62 (for which data is not available). Loads which hit earlier stores are selected for reprobing until the store data becomes available (at which time the data is forwarded for the load). A memory type field 96Q is included in LS2 buffer entry 94 as well. The memory type may be provided by data cache 28 upon translating the address of the memory operation. Among other things, the memory type may indicate if the memory operation is cacheable or non-cacheable. This information may be used for determining whether or not SMC checks are to be performed, for example.

Finally, a general control field 96R may be included for additional control bits as desired. For example, additional information from the translation of the address which is specific to the instruction set architecture. In one embodiment, a reprobe bit may be included to indicate that a store hit must reprobe because intervening activity caused the line to be evicted. Additionally, the way of data cache 28 that hits may be stored for use in updating data cache 28 with store data. Yet another bit may be defined to indicate that bus interface unit 37 is in the process of acquiring a state for a cache line updated by a store which will allow the store to complete. Still further, linear address bits which have been translated but which are used for indexing may be stored in control field 96R. Control information may be included or excluded according to design choice.

Computer System

Figure 13:
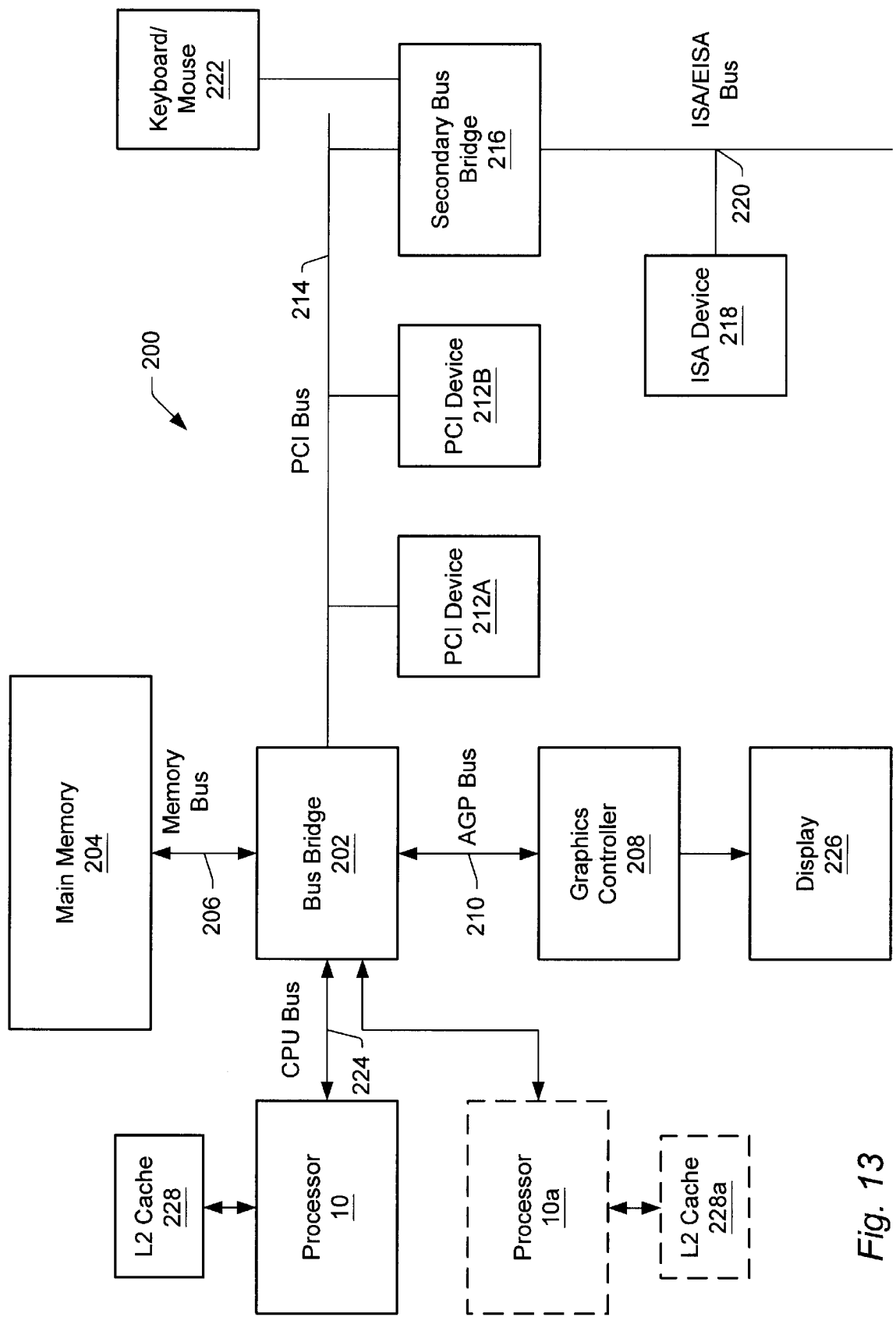
FIG. 13 is a block diagram of one embodiment of a computer system including the processor shown in FIG. 1.

Turning now to FIG. 13, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10*a* shown as an optional component of computer system 200). Processor 10*a* may be similar to processor 10. More particularly, processor 10*a* may be an identical copy of processor 10. Processor 10*a* may be connected to bus bridge 202 via an independent bus (as shown in FIG. 13) or may share CPU bus 224 with processor 10. Furthermore, processor 10a may be coupled to an optional L2 cache 228*a* similar to L2 cache 228.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that Ad the n-bit value is valid. Resetting the valid bit may comprise discarding the value. Other methods of discarding a value may be used as well.

It is noted that, while a variety of embodiments described above showed comparators coupled to buffers for comparing values within the buffers to input values, these buffers may equivalently be implemented as content addressable memories (CAMs), at least for the portions of the entries being compared, as desired. It is further noted that various embodiments above may be used separately from other embodiments, or may be used in combination with one or more other embodiments, as desired.

Numerous variations and modifications will become apparent to those skilled in the art once the above disclosure is fully appreciated. It is intended that the following claims be interpreted to embrace all such variations and modifications.

What is claimed is:

1. A load/store unit comprising:
a buffer including a plurality of entries, each of said plurality of entries configured to store a data address and a last-in-buffer (LIB) indication, wherein said LIB indication, in a first state, is indicative that a corresponding store memory operation is a youngest store memory operation within said buffer to update a memory location identified by said data address; and
control logic coupled to said buffer and to receive a first data address probing a data cache, wherein said control logic is configured to identify a first entry of said plurality of entries for which: (i) said data address stored in said first entry matches said first data address, and (ii) said LIB indication stored in said first entry is in said first state.

2. The load/store unit as recited in claim 1 wherein said control logic, in response to store data being valid within said first entry and said first address corresponding to a first load memory operation, is configured to cause said store data from said first entry to be forwarded as a result of said first load memory operation.

3. The load/store unit as recited in claim 2 wherein said first entry is further configured to store a store instruction tag identifying a first store memory operation assigned to said first entry, and wherein said control logic is configured to select said store instruction tag from said first entry if said store data within said first entry is invalid.

4. The load/store unit as recited in claim 3 wherein said control logic is configured to store said store instruction tag into a second entry of said plurality of entries, said second entry assigned to said first load memory operation.

5. The load/store unit as recited in claim 4 wherein said control logic is configured to select said first load memory operation to reprobe said data cache from said second entry.

6. The load/store unit as recited in claim 5 wherein said control logic, during said reprobing, is configured to compare said store instruction tag from said second entry to a plurality of instruction tags stored in said buffer.

7. The load/store unit as recited in claim 6 wherein said control logic, in response to a match between said store instruction tag from said second entry and a store instruction tag in said first entry, is configured to cause said store data from said first entry to be forwarded even if said LIB indication in said first entry is in a second state indicative that said first store memory operation is not youngest within said buffer to update said memory location identified by said data address, provided said store data is valid.

8. The load/store unit as recited in claim 1 wherein, in response to said first data address corresponding to a second store memory operation, said control logic is configured to set said LIB indication to a second state indicative that said first store memory operation is not youngest within said buffer to update said memory location identified by said data address.

9. The load/store unit as recited in claim 8 wherein said LIB indication comprises an LIB bit and a clear LIB bit.

10. The load/store unit as recited in claim 9 wherein said first state comprises said LIB bit and said clear LIB bit having opposite binary values.

11. The load/store unit as recited in claim 9 wherein said second state comprises said LIB bit and said clear LIB bit having a same binary value.

12. A processor comprising:
a data cache configured to store data; and
a load/store unit coupled to said data cache, said load store unit including:
a buffer including a plurality of entries, each of said plurality of entries configured to store a data address and a last-in-buffer (LIB) indication, wherein said LIB indication, in a first state, is indicative that a corresponding store memory operation is a youngest store memory operation within said buffer to update a memory location identified by said data address; and
control logic coupled to said buffer and to receive a first data address probing said data cache, wherein said control logic is configured to identify a first entry of said plurality of entries for which: (i) said data address stored in said first entry matches said first data address, and (ii) said LIB indication stored in said first entry is in said first state.

13. The processor as recited in claim 12 wherein said control logic, in response to store data being valid within said first entry and said first address corresponding to a first load memory operation, is configured to cause said data cache to forward said store data from said first entry as a result of said first load memory operation.

14. The processor as recited in claim 13 wherein said first entry is further configured to store a store instruction tag identifying a first store memory operation assigned to said first entry, and wherein said control logic is configured to select said store instruction tag from said first entry if said store data within said first entry is invalid.

15. The processor as recited in claim 14 wherein said control logic is configured to store said store instruction tag into a second entry of aid plurality of entries, said second entry assigned to said first load memory operation.

16. The processor as recited in claim 15 wherein said control logic is configured to select said first load memory operation to reprobe said data cache from said second entry.

17. The processor as recited in claim 16 wherein said control logic, during said reprobing, is configured to compare said store instruction tag from said second entry to a plurality of instruction tags stored in said buffer.

18. The processor as recited in claim 17 wherein said control logic, in response to a match between said store instruction tag from said second entry and a store instruction tag in said first entry, is configured to cause said data cache to forward said store data from said first entry even if said LIB indication in said first entry is in a second state indicative that said first store memory operation is not youngest within said buffer to update said memory location identified by said data address, provided said store data is valid.

19. The processor as recited in claim 12 wherein, in response to said first data address corresponding to a second store memory operation, said control logic is configured to set said LIB indication to a second state indicative that said first store memory operation is not youngest within said buffer to update said memory location identified by said data address.

20. The processor as recited in claim 19 wherein said LIB indication comprises an LIB bit and a clear LIB bit.

21. The processor as recited in claim 20 wherein said first state comprises said LIB bit and said clear LIB bit having opposite binary values.

22. The processor as recited in claim 20 wherein said second state comprises said LIB bit and said clear LIB bit having a same binary value.

23. A computer system comprising:
a processor including:
  a data cache configured to store data; and
  a load/store unit coupled to said data cache, said load store unit including:
    a buffer including a plurality of entries, each of said plurality of entries configured to store a data address and a last-in-buffer (LIB) indication, wherein said LIB indication, in a first state, is indicative that a corresponding store memory operation is a youngest store memory operation within said buffer to update a memory location identified by said data address; and
    control logic coupled to said buffer and to receive a first data address probing said data cache, wherein said control logic is configured to identify a first entry of said plurality of entries for which: (i) said data address stored in said first entry matches said first data address, and (ii) said LIB indication stored in said first entry is in said first state; and
an I/O device coupled to said processor, said I/O device configured to communicate between said computer system and another computer system to which said I/O device is coupled.

24. The computer system as recited in claim 23 wherein said I/O device comprises a modem.

25. The computer system as recited in claim 24 further comprising a second processor coupled in parallel with said processor.

26. A method comprising:
probing a data cache with a first data address corresponding to a first memory operation; and
identifying a first entry within a buffer of memory operations, said first entry storing a second data address of a second memory operation and a last-in-buffer (LIB) indication, said identifying including:
  determining that said second address matches said first address; and
  determining that said LIB indication is in a first state indicative that said second memory operation comprises a store memory operation which is youngest in said buffer to update a memory location identified by said second address.

27. The method as recited in claim 26 further comprising, if said first memory operation comprises a load memory operation:
  determining if store data within said first entry is valid; and
  forwarding said store data as a result of said load memory operation.

28. The method as recited in claim 27 further comprising, if said store data is invalid:
  selecting a store instruction tag from said first entry; and
  storing said instruction tag in a second entry within said buffer, said second entry allocated to said load memory operation.

29. The method as recited in claim 28 further comprising:
  selecting said load from said second entry to reprobe said data cache; and
  comparing said store instruction tag in said second entry to a plurality of instruction tags in said buffer.

30. The method as recited in claim 29 further comprising, if said store instruction tag matches said store instruction tag in said first entry, forwarding said store data from said first entry as a result of said load memory operation even if said LIB indication in said first entry is in a second state indicative that said store memory operation is not youngest within said buffer to update said memory location identified by said first data address.

31. The method as recited in claim 26 further comprising, if said first memory operation comprises a second store memory operation, setting said LIB indication in said first entry to a second state indicative that said store memory operation is not youngest within said buffer to update said memory location identified by said first data address.

32. The method as recited in claim 31 further comprising setting a second LIB indication in a second entry allocated to said second store memory operation to said first state.

* * * * *

UNITED STATES PATENT AND TRADEMARK OFFICE
CERTIFICATE OF CORRECTION

PATENT NO. : 6,393,536 B1
DATED : May 21, 2002
INVENTOR(S) : William A. Hughes and James S. Roberts It is certified that error appears in the above-identified patent and that said Letters Patent is hereby corrected as shown below:

<u>Title page,</u>
Item [54], please insert -- Detection -- after "Load-Hit-Store."

<u>Column 34,</u>
Line 55, please delete "aid", and insert -- said -- in place thereof.

Signed and Sealed this

Twelfth Day of November, 2002

*Attest:*

*Attesting Officer*

JAMES E. ROGAN
*Director of the United States Patent and Trademark Office*